US006980177B2

(12) United States Patent
Struyk

(10) Patent No.: US 6,980,177 B2
(45) Date of Patent: Dec. 27, 2005

(54) SEQUENTIAL INVERSE ENCODING APPARATUS AND METHOD FOR PROVIDING CONFIDENTIAL VIEWING OF A FUNDAMENTAL DISPLAY IMAGE

(75) Inventor: David A Struyk, Deephaven, MN (US)

(73) Assignee: Waterstrike Incorporated, Excelsior, MN (US)

( * ) Notice: Subject to any disclaimer, the term of this patent is extended or adjusted under 35 U.S.C. 154(b) by 322 days.

(21) Appl. No.: 10/205,864

(22) Filed: Jul. 24, 2002

(65) Prior Publication Data

US 2003/0128218 A1 Jul. 10, 2003

Related U.S. Application Data

(60) Provisional application No. 60/309,856, filed on Aug. 3, 2001.

(51) Int. Cl.[7] ............................................... G09G 5/00
(52) U.S. Cl. ...................... 345/8; 345/5; 345/6; 345/7
(58) Field of Search ............................... 345/433–439, 345/8, 581, 5–7, 32; 382/284, 268; 351/209; 702/84; 356/346; 395/127; 380/56, 54; 340/5.6, 5.53

(56) References Cited

U.S. PATENT DOCUMENTS

| | | |
|---|---|---|
| 4,879,603 A | 11/1989 | Berman |
| 5,028,994 A | 7/1991 | Miyakawa et al. |
| 5,406,627 A | 4/1995 | Thompson et al. |
| 5,488,496 A | 1/1996 | Pine |
| 5,537,476 A * | 7/1996 | Coteus et al. .................. 380/54 |
| 5,614,920 A | 3/1997 | Coteus et al. |
| 5,619,219 A | 4/1997 | Coteus et al. |
| 5,629,984 A | 5/1997 | McManis |
| 5,684,561 A * | 11/1997 | Yancey ........................ 351/209 |

(Continued)

FOREIGN PATENT DOCUMENTS

| | | |
|---|---|---|
| JP | 64032332 | 2/1989 |
| JP | 05119754 | 5/1993 |

OTHER PUBLICATIONS

Ohtake and Aoki, A Study of Security for CRT Display with Liquid Crystal Shutter, The Transactions of the Institute of Electronics, Information and Communication Engineers, Apr. 25, 1990, pp. 453–455, vol. 373–D–I No. 4, Japan.

Rogers, for Your Eyes Only, Computer Graphics World, Dec., 1998, pp. 16–17, Pennwell Publish, U.S.

*Primary Examiner*—Vijay Shankar
*Assistant Examiner*—Prabodh Dharia
(74) *Attorney, Agent, or Firm*—Schroeder & Siegfried, P.A.

(57) ABSTRACT

An image altering apparatus which provides confidential viewing of a video display by means of time multiplexing the fundamental display image with a color-inverted image thereof on a pixel-by-pixel basis. Electronic circuitry and/or software are utilized to modify the fundamental image signal by time multiplexing its color data components with corresponding inverse color data components to generate a compound image signal which is representative of a substantially featureless image. Different multiplexing sequences of color data components and inverse color data components may be utilized at varying duty cycles to generate a compound image which is highly confidential and secure from unauthorized viewing. The fundamental image may be decoded and viewed only by those viewing the encoded image through specially designed eyeglasses incorporating time synchronized LCD shutters, variable polarizers, or color filters, which can selectively block inverted color components and/or demodulate the fundamental image to allow only the true fundamental color components to pass, thereby providing confidential and highly secure viewing of the fundamental image by the viewer.

61 Claims, 7 Drawing Sheets

(1 of 7 Drawing Sheet(s) Filed in Color)

U.S. PATENT DOCUMENTS

| | | | | |
|---|---|---|---|---|
| 5,706,416 A | * | 1/1998 | Mann et al. | 345/427 |
| 5,801,697 A | | 9/1998 | Parikh et al. | |
| 5,828,793 A | * | 10/1998 | Mann | 382/284 |
| 5,963,371 A | | 10/1999 | Needham et al. | |
| 6,198,532 B1 | * | 3/2001 | Cabib et al. | 356/456 |
| 6,292,092 B1 | * | 9/2001 | Chow et al. | 340/5.6 |
| 6,317,522 B1 | * | 11/2001 | Rackett | 382/268 |
| 6,529,209 B1 | | 3/2003 | Dunn et al. | |
| 6,662,128 B2 | * | 12/2003 | Barbour et al. | 702/84 |
| 2003/0038838 A1 | | 2/2003 | Pollitt | |
| 2003/0046537 A1 | | 3/2003 | Smith | |

* cited by examiner

Fig.-6A

DEFAULT VGA PALETTE CONTENTS (79)

| | RED | GREEN | BLUE |
|---|---|---|---|
| 0 | 0 | 0 | 0 |
| 1 | 0 | 0 | 42 |
| 2 | 0 | 42 | 0 |
| 3 | 0 | 42 | 42 |
| 4 | 42 | 0 | 0 |
| 5 | 42 | 0 | 42 |
| 6 | 42 | 21 | 0 |
| 7 | 42 | 42 | 42 |
| 8 | 21 | 21 | 21 |
| 9 | 21 | 21 | 63 |
| 10 | 21 | 63 | 21 |
| 11 | 21 | 63 | 63 |
| 12 | 63 | 21 | 21 |
| 13 | 63 | 21 | 63 |
| 14 | 63 | 63 | 21 |
| 15 | 63 | 63 | 63 |

Fig.-6B

CONVERTED VGA DEFAULT COLOR VALUES FOR $\gamma=2.5$ (87)

| | RED | GREEN | BLUE |
|---|---|---|---|
| 0 | 63 | 63 | 63 |
| 1 | 63 | 63 | 53 |
| 2 | 63 | 53 | 63 |
| 3 | 63 | 53 | 53 |
| 4 | 53 | 63 | 63 |
| 5 | 53 | 63 | 53 |
| 6 | 53 | 61 | 63 |
| 7 | 53 | 53 | 53 |
| 8 | 61 | 61 | 61 |
| 9 | 61 | 61 | 0 |
| 10 | 61 | 0 | 61 |
| 11 | 61 | 0 | 0 |
| 12 | 0 | 61 | 61 |
| 13 | 0 | 61 | 0 |
| 14 | 0 | 0 | 61 |
| 15 | 0 | 0 | 0 |

SEQUENTIAL INVERSE ENCODING APPARATUS AND METHOD FOR PROVIDING CONFIDENTIAL VIEWING OF A FUNDAMENTAL DISPLAY IMAGE

CROSS REFERENCE TO RELATED APPLICATIONS

This application is an application for a patent which is also disclosed in Provisional Application Ser. No. 60/309,856, filed on Aug. 3, 2001 by the same inventor, namely David A. Struyk, and entitled "IMAGE ALTERING APPARATUS AND METHOD FOR PROVIDING CONFIDENTIAL VIEWING OF A FUNDAMENTAL DISPLAY IMAGE," the benefit of the filing date of which is hereby claimed.

This application is also related to co-pending non-provisional application Ser. No. 10/205,866, filed on even date herewith by the same inventor, and entitled "IMAGE ALTERING APPARATUS AND METHOD FOR PROVIDING CONFIDENTIAL VIEWING OF A FUNDAMENTAL DISPLAY IMAGE", the contents of which are incorporated herein by reference thereto.

BACKGROUND OF THE INVENTION

The present invention is related generally to the art of confidential viewing of video displays, and more particularly to an apparatus and method for altering a fundamental display image to generate a compound substantially featureless image which can be decoded for confidential viewing of the fundamental image only by the intended viewer.

With the increasing use of video displays for a variety of systems, such as those used in desktop computers, laptop computers, televisions, and personal video entertainment systems, there exists an increasing need and desire to provide confidential viewing of these displays by only those who the displayed content is intended for, thus eliminating the possibility of unauthorized viewing.

Various devices have been introduced over the years to prevent unauthorized viewing of video displays. The simplest devices generally include a form of "anti-glare" privacy screen and/or hoods and shields commonly found on desktop computer displays which are intended to restrict viewing to only those who are more or less directly in front of the display. While these are somewhat effective, they cannot prevent viewing by someone peering over ones shoulder, and thus are far from secure.

U.S. Pat. No. 5,488,496, issued Jan. 30, 1996, discusses the removal of the top polarizing layer of an LCD screen. This renders the display "invisible" except to those wearing polarized glasses. However, this system is hardly secure, as anyone can obtain polarized glasses, even ordinary Polaroid glasses. Additionally, the screen is not easily converted between confidential and normal viewing modes, and is only applicable to LCD screens.

IBM has also addressed this issue in four recent patents. U.S. Pat. No. 5,537,476, issued on Jul. 16, 1996, provides secure viewing of a display by utilizing a second set of "primary" colors, which are wavelength-shifted from those used to generate the fundamental image. When combined with the fundamental image in correct proportions, the resulting composite image masks the fundamental image. Secure viewing is provided by viewing the composite image through specially formulated narrow-band filtered glasses, which block the second set of primaries, allowing the fundamental set to pass. However, this approach has many drawbacks: 1) it requires two sets of separate narrow-band color primaries which are wavelength-shifted and do not significantly overlap in their spectrums; 2) a single video display containing pixels of two sets of wavelength-shifted primary colors does not commonly exist and, if so, would require twice as many pixels to maintain the same effective resolution as a single primary set display; 3) to align or overlay two separate video displays, perhaps through the use of a beam splitter as discussed in the patent, would not be an economical solution and would suffer greatly from parallax errors; 4) the viewing glasses require three narrow-band and accurately placed spectral notch filters to block the second set of wavelength-shifted primary colors; and 5) anyone wearing glasses of the proper filter arrangement may still view the fundamental display.

U.S. Pat. No. 5,614,920, issued on Mar. 25, 1997, utilizes a flashing screen of light placed between the video display and the viewer to obscure the fundamental image. Confidential viewing is provided by means of LCD shutters which are time synchronized to block the pulses of light and permit viewing of the fundamental image. However, this approach requires the use of an additional optical light screen, requiring additional power and potentially being distracting or annoying to those in the vicinity of the display not wearing the shutter glasses.

U.S. Pat. No. 5,619,219, issued on Apr. 8, 1997, is similar to both previous IBM patents. This patent suggests the introduction of a secondary wavelength-shifted optical light screen mask between the video display and the viewer. The light masking source utilized is intended to be narrow in its spectra, and not conflicting or interfering with the primary colors of the fundamental display image, so that narrow-band filtered glasses may absorb, or block, the wavelength-shifted light, allowing the fundamental image to pass. This approach has many of the inherent limitations of both the prior two patents.

U.S. Pat. No. 5,801,697, issued on Sep. 1, 1998, is essentially a software application which allows selective shielding of various areas of the display, to cover or hide confidential information. There is no viewing means for full screen confidential viewing, and it provides only slightly greater security than that inherent to Microsoft Windows, i.e., simply reducing the window size to hide sensitive information.

Sun Microsystems has also addressed the need for confidential viewing in U.S. Pat. No. 5,629,984, issued May 13, 1997. In this patent, the use of pre-set video flash frames is suggested, which are intended to prevent an unauthorized person not wearing appropriate shutter glasses from intelligibly reading the video display by influencing the person's eye prior to displaying the video data frame. Similar to U.S. Pat. No. 5,614,920, this patent suggests the use of a predetermined obscuring "flash" which has no relation to the fundamental image. While this approach may obscure the image, the overall image will be far from featureless, and potentially annoying to those not wearing the appropriate eyewear.

Intel Corporation has also visited this subject in U.S. Pat. No. 5,963,371, issued on Oct. 5, 1999. In this patent, a method is described for displaying private data to collocated users of the same display, all of whom are required to wear appropriate eyewear. Privacy for a single user may also be obtained by alternating the desired data with that of masking data, where the mask pattern is either a static, predetermined pattern, or a random pattern of black and white pixels, unrelated to the fundamental image, designed to obscure the corresponding areas of the opposite image. This approach is entirely inadequate for the masking of images. It does not provide for a featureless image, and is not suitable for real-time full motion video.

In addition to the above, Shin Ohtake and Yoshinao Aoki, of Japan, published results of their experiments on masking text characters of a CRT display in 1990. Character masking was achieved by synchronously displaying multiple text screens of primary text font characters and experimentally-determined masking font characters. Confidential viewing was provided by viewing the display through LCD shutter glasses synchronized to block the masking fonts. This approach proved to be somewhat successful for text, but does not lend itself to full color graphics or images.

Similar to Ohtake and Aoki, Sony addressed this topic in Japanese Patent No. 05119754 JP, filed in 1991 and published in 1993. This patent discusses alternating a display object screen with a complementary color screen. However, as it will be pointed out later with more detail, an image when mixed with its color complement rather than its color inverse will not necessarily result in a featureless image.

Toshiba, in Japanese Patent No. 01032332 JP published in 1989, discloses the extension of 3-Dimensional viewing applications to that of screen security. They propose that by separating the image to the left and right perspective views, that the combined image is blurred and security is enhanced. Viewing the image through synchronized glasses clears the image as well as providing for 3-dimensional viewing. In practice however, the features of the combined image, while blurred somewhat, are highly distinguishable.

Finally, head-mounted displays are becoming ever more popular, but are expensive and do not facilitate easy viewing of your surroundings or computer keyboard.

Therefore, given the desire and need for a simple, low cost, and effective means of display security, and the limitations of the prior art, it is apparent that a better means is necessary for providing confidential viewing of a standard video display, which does not require cumbersome, cost-intensive supplemental and/or wavelength-shifted masking light sources, and which can be used in all applications of full color/full motion graphics and images.

It is believed that my image altering apparatus and method as described hereafter accomplishes this end while minimizing the cost of implementation and greatly enhancing the viewing security of video displays today.

BRIEF SUMMARY OF THE INVENTION

In accordance with the present invention, an apparatus is described herein for providing confidential viewing of a video display by means of time multiplexing a fundamental image with a color-inverted image thereof, on a pixel by pixel basis, thereby generating a resulting compound image on the video display which is substantially featureless to the naked eye of an observer. With the aid of time-synchronized decoding eyewear, an intended viewer may extract the fundamental image from the compound image for confidential viewing without risking the possibility of unauthorized viewing by others.

It is noted with primary importance that the present invention is adapted for use in connection with virtually all standard video displays that are composed of a plurality of color-generating pixels, and it does not require secondary light sources or additional obscuring screens to provide the desired confidential viewing of a fundamental image.

Thus, with more particularity, the present invention is an image altering apparatus which functions in combination with a standard video display, the pixels of which include means for displaying one or more color components of a viewable image. The present invention further includes an image signal generator which produces a fundamental image signal having at least one color data component corresponding to each pixel of the video display, wherein each color data component is representative of a color component of the fundamental image.

In order to provide confidential viewing of the fundamental image, the present invention includes a signal modifying means for modifying the fundamental image signal to generate a compound image signal that is representative of a substantially featureless image. This signal modifying means may be composed of electronic hardware and/or software, and functions to generate the compound image signal by time multiplexing each color data component of the fundamental image signal with at least one corresponding inverse color data component thereof. Thus, the resulting compound image signal is composed of one or more compound color data components corresponding to each pixel utilized from the video display, wherein each compound color data component is comprised of a color data component, time multiplexed with its corresponding inverse color data component(s).

Of particular importance, it is noted that each inverse color data component is generated from, and as a function of, a corresponding color data component of the fundamental image signal, and is therefore representative of the same color component of the fundamental image. Moreover, since signal amplitude is directly related to image color intensity, albeit non-linearly, the amplitude of each inverse color data component is determined as a function of the amplitude of its corresponding color data component, such that the time-weighted average of the color intensities corresponding to the amplitudes of all color data components and corresponding inverse color data components is substantially the same for each compound color data component corresponding to the same pixel. Stated otherwise, for each pixel, the calculated amplitude of each inverse color data component during a given display frame is set such that the intensity of each corresponding color component of the resulting compound image is substantially the same as all other color components.

Because the fundamental and inverse color data components are time multiplexed at a sufficiently high frequency that the human eye cannot discern therebetween, the intensities of all color components of the resulting image generated by the compound image signal will appear to be substantially the same for each pixel. As a consequence, there is no visible variation in color or intensity from pixel to pixel, and the resulting compound image appears to be substantially featureless. Thus, by time multiplexing the individual color data components of a fundamental image signal with corresponding inverse color data components, on a pixel by pixel basis, the fundamental image is essentially time multiplexed with a computed color inverted image thereof, to generate a resulting compound image which is substantially neutral and featureless to the naked eye of an observer.

It should be understood that the true inverse of an image, or any color component thereof, is not synonymous with its complement. While any color of the visible spectrum mixed with its complement will result in a shade of white, an entire video image mixed on a pixel by pixel basis will result in an image having varying intensities of white, or shades of gray. Thus, an image mixed, or multiplexed, with its complement would not necessarily be completely masked, since regions of contrast may still be discerned (such as dark text on a light background). For this reason, in order to truly obtain a substantially featureless image, the image, or its color components, must be mixed with the true inverse thereof. In such case, all color components of the resulting image corresponding to each pixel are of substantially the same intensity, thus causing the resulting image to appear substantially featureless.

In accordance with the above principles, different multiplexing sequences of color data components and inverse color data components may be utilized at varying duty cycles to generate a compound image which is highly confidential and secure from unauthorized viewing. In one basic embodiment, referred to herein as the alternate inverse encoding scheme, each color data component of the fundamental image signal and a corresponding inverse color data component may be time multiplexed alternately on a 50% duty cycle. This is done at a sufficiently high frequency that the human brain will interpret the composition of color components and inverse color components generated thereby as a single compound mixed image which is 50% gray and substantially featureless.

Alternatively, the relative display sequence of color data components and inverse color data components may be sequentially or randomly altered, and/or multiplexed with multiple inverse color data components, to provide greater levels of security and more sophisticated schemes of decoding the fundamental image. For instance, in one preferred embodiment, each color data component of the fundamental image signal is time multiplexed with a pair of corresponding inverse color data components utilizing a one-third (⅓) duty cycle system. By maintaining the above-stated relationship between the amplitudes of the fundamental and inverse color data components, the resulting compound image produced will appear substantially featureless to the naked eye. Moreover, by sequentially altering the display sequence of the fundamental color data components, display flicker is reduced, and security is further enhanced, thereby requiring more advance techniques of decoding using time synchronized color filters to view the fundamental image. Of course, a number of other alternative display sequences and decoding systems may also be employed, which will be discussed in greater detail hereinafter.

In addition to the above, combined hardware/software implementations of the signal modifying means may also be employed to allow flexibility of selectively encoding only specific areas of a display, while allowing other areas of the display to remain completely visible to all. Also, adjustment may be made to the signal modifying means to alter the intensity level of selected portions of the display, thereby enabling encrypted or non-encrypted messages such as "SECURE" and "CONFIDENTIAL," to be overlaid on the compound substantially featureless image, while still maintaining a high degree of security. Additionally, through adjustments in contrast and/or duty cycle, misleading visible images may be overlayed on top of the compound substantially featureless image, thereby further enhancing overall security.

In order to decode and extract the fundamental image from the resulting compound image, specialized eyewear is utilized which incorporates time-synchronized LCD shutters, variable polarizers, or similarly synchronized color filters, which can selectively block the inverted color components of the resulting compound image, thereby allowing only the true fundamental color components to pass. In the more basic system where all color components of the fundamental image are displayed in sync with one another, LCD shutter glasses or variable polarizers may be utilized to effectively block the inverse color components of the compound substantially featureless image. In the more advanced systems, however, involving sequentially or randomly altered display sequences of the fundamental image color components, more sophisticated synchronized color filters must be utilized to decode the fundamental image from the compound image.

Thus, it is apparent that a high level of security is provided through the use of my improved image altering apparatus, which is cost effective and can be employed to provide confidential viewing in all applications of full color graphics and images, without the need for cost-intensive supplemental and/or wavelength-shifted masking light sources.

These and other objects and advantages of the invention will more fully appear from the following description, made in connection with the accompanying drawings, wherein like reference characters refer to the same or similar parts throughout the several views, and in which:

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

FIG. 6A is a default look-up table stored in the palette register of a typical video graphics adapter as shown in FIG. 6;

FIG. 6B is an alternate look-up table for storage within a palette register, containing inverted VGA default color values corresponding to those shown in the table depicted in FIG. 6A;

DETAILED DESCRIPTION OF THE INVENTION

Figure 1:
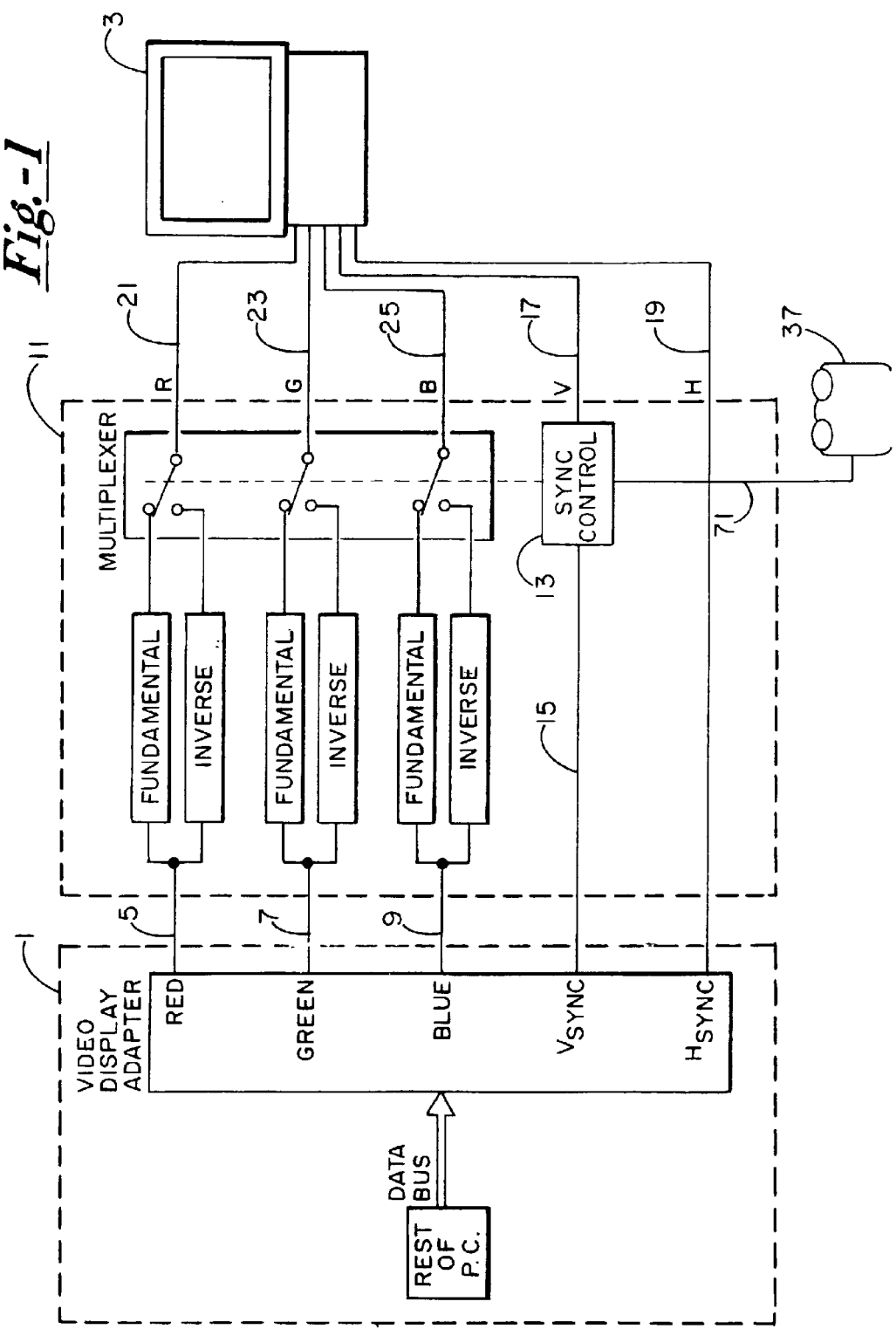
FIG. 1 is a diagrammatical block diagram depicting my invention of an image altering apparatus for providing confidential viewing of a fundamental display image in accordance with the present invention.

In order to better describe the invention herein, it is helpful to first explain briefly the concept of "primary color addition" as it pertains to light produced by video displays, and the response of the human eye with respect to the same. Virtually all common video displays, from color television and CRT displays, to LCD screens, plasma displays, etc., generate an image through the additive mixture of three primary colors of light: red; blue; and green. A video display typically has thousands of tiny areas, called pixels, that produce light of a specific color representative of an image at that specific location. Each pixel, in turn, is generally composed of a triad of smaller areas, or sub-pixels, consisting of tiny phosphors, color filters, or the like, which individually produce the primary colors red, blue, and green.

As one views a color image produced on a video display, the human eye does not detect each red, green, or blue sub-pixel separately. Rather, depending on the intensity of each primary color component, the color sensitive cones within the human eye react to the primary colors, such that one viewing the video display will see a range of many colors combined to produce the desired image. Thus, depending upon the varying intensities of light produced by each sub-pixel, the corresponding pixel will produce a composite light that appears as a different color to the human eye. If the intensities of all red, blue, and green components of a given pixel are the same, that pixel will produce a neutral white light.

As stated previously, and as used herein, it is noted that the "inverse" of a color or its image is not synonymous with its color complement. If any color of a visible spectrum is mixed with its color complement, the resulting color is a shade of white. However, if an entire video image is mixed with its color complement, on a pixel-by-pixel basis, the resulting image would likely be comprised of varying intensities of white, or shades of gray. This is so because the intensity of the individual red, green, and blue components may vary within each pixel, and from pixel to pixel, Thus, mixing an entire image with its color complement, on a pixel-by-pixel basis, will produce a composite image that may very well have regions of contrast which make the fundamental display image discernable to the naked eye of a viewer (such as a dark text on a light background).

By contrast, mixing a fundamental image with its true inverse will not leave contrasting regions of discernable fundamental features. This is so because the intensity of the individual red, green, and blue color components of an inverse image are appropriately determined such that, when mixed on a pixel-by-pixel basis with the fundamental image, all compound color components (red, green, and blue) of the resulting compound image are of substantially the same intensity at all pixel locations. Thus, each pixel produces a neutral white light of substantially the same intensity as all others, and the overall compound image appears substantially neutral and featureless to the naked eye. For this reason, in order to provide complete masking of a fundamental image and facilitate confidential viewing, it is the objective of the invention herein to mix, or multiplex, a fundamental image, on a pixel-by-pixel basis, with the true inverse thereof.

Meeting the above objective is complicated by the fact that the intensity of any color component displayed at a given pixel location may not be directly proportional to the signal which produces the same. In other words, color intensity may not be directly proportional to the voltage amplitude of the color producing signal. Rather, the relationship between the two is typically one of nonlinearity caused by a phenomenon commonly known as "monitor gamma." Gamma, as referred to herein by the Greek symbol ($\gamma$), describes a nonlinear relationship which exists between the input voltage of a typical cathode ray tube (CRT) display and the corresponding output intensity. A conventional CRT has a power-law response to voltage: luminance produced at the display is approximately proportional to the applied voltage raised to the $\gamma$ power. This nonlinearity must be accounted for when making the inverse calculation, or a featureless image will not be obtained. Because of the ubiquitous nature of CRT displays, even newer LCD and plasma displays often incorporate such gamma scaling for compatibility.

In accordance with the foregoing objective, as shown in FIG. 1, the present invention includes an image signal generator 1 (typically a video display adapter within a personal computer) which generates a fundamental image signal representative of a fundamental image to be produced on a video display 3. For full color video displays, the fundamental image signal includes red, green, and blue color data components which are output from a signal generator or personal computer 1 along lines 5, 7 and 9, respectively. Each color data component of the fundamental image signal is transmitted from the signal generator 1 to a signal modifying means 11, where it is time multiplexed with at least one corresponding inverse color data component thereof Sync control mechanism 13 is provided for performing the toggling function between the relative fundamental and inverse color data components in sync with the vertical sync signal, and for controlling the relative display sequencing pattern of the same. Thus, the vertical sync line 15 from signal generator 1 is input to sync controller 13 to provide the clock function therefor, and is output from sync controller 13 along line 17 to video display 3 for controlling the vertical refresh rate of the same. Horizontal sync line 19 is also provided from signal generator 1 to display 3 for controlling the horizontal synchronization of display 3 in a conventional manner.

The resulting compound image signal exiting the signal modifying means 11 is then composed of corresponding red, green, and blue multiplexed compound color data components that are output to video display 3. As shown in FIG. 1, the corresponding red, green, and blue compound color data components generated by the signal modifying means 11 are output to video display 3 along lines 21, 23, and 25, respectively. The result is a modified compound image which appears substantially neutral and featureless to the naked eye. Specialized eyewear 37, which will be discussed in more detail hereafter, are provided for decoding the fundamental image from the modified compound image. Eyewear 37 are controlled in synchrony with the multiplexed compound color data components by sync controller 13 to effectively block from view the inverse color components of the resulting compound image, thus allowing the fundamental image to pass.

Figure 2:
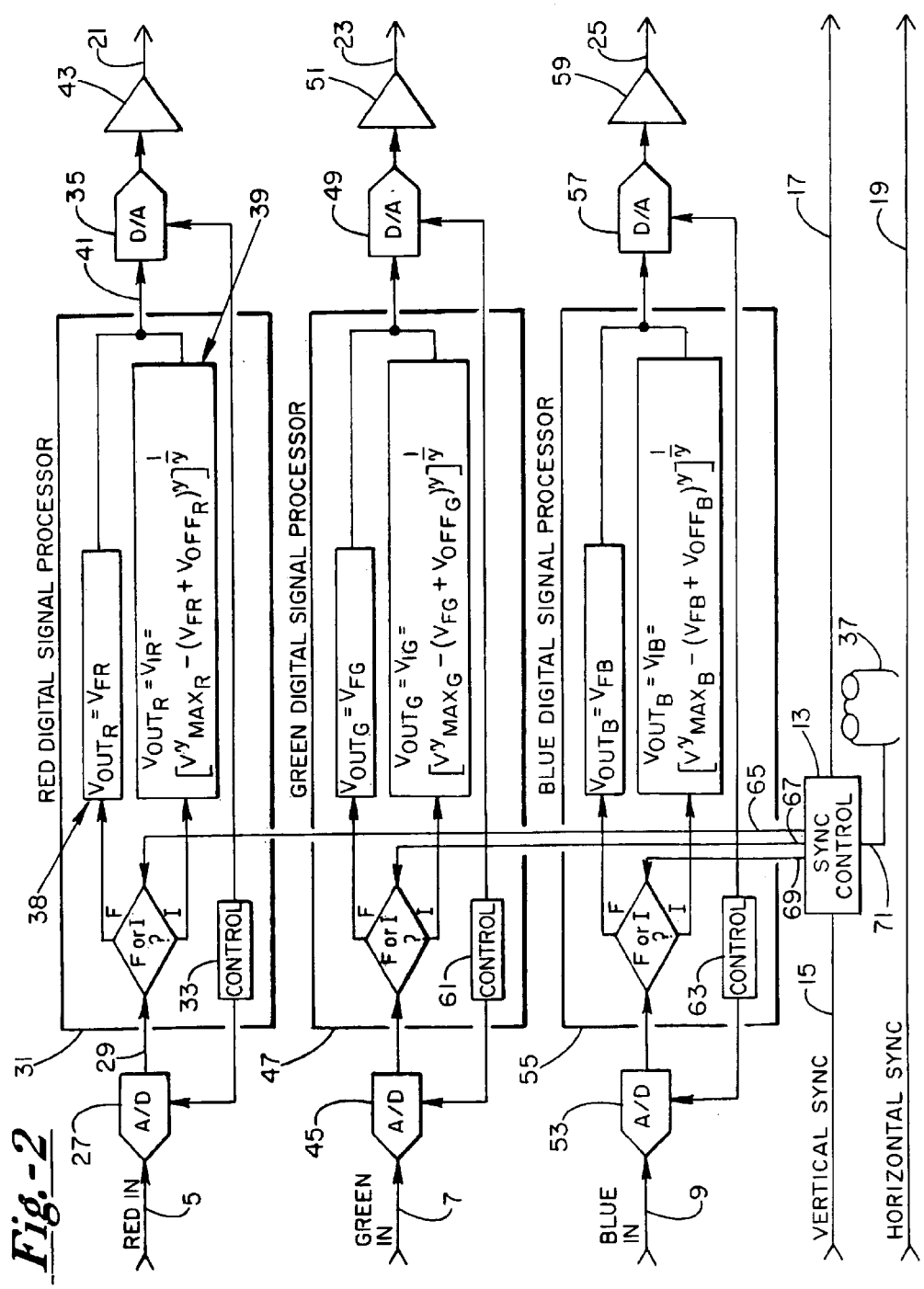
FIG. 2 is a schematic diagram showing in detail the signal modifying means utilized in external implementation of one basic embodiment of my present invention.

The basic hardware embodiment of signal modifying means 11 is shown in FIG. 2. From FIG. 2, it is seen that the analog red fundamental color data component produced by signal generator 1 is transmitted along line 5 into an analog-to-digital converter (ADC) 27 which samples and converts the red fundamental color data component into a numeric (digital) representation, designated herein as VFR. This digital data is then input along line 29 to the "red" digital signal processor (DSP) 31, a high-speed digital processor capable of rapid mathematical processing of digital data.

Controller 33 of DSP 31 controls the processing of the digital data input therein, and is also connected to the ADC 27 at the input of DSP 31, and to the digital-to-analog converter (DAC) 35 at the output of DSP 31, for controlling the relative conversion sampling rate of each.

As shown in FIG. 2, the digital "red" fundamental color data component $V_{FR}$ input on line 29 is either passed through DSP 31 unprocessed, as depicted on line 38, or is subjected to the inversion operation denoted on line 39, wherein the incoming digital signal is processed in accordance with the following inversion formula, which accounts for monitor gamma:

$$V_{inv}=[V'_{max}-(V_{fund}+V_{off})^{\gamma}]^{(1/\gamma)}$$

wherein $V_{inv}$ represents the inverse voltage amplitude, $V_{max}$ represents the maximum signal voltage, $V_{fund}$ represents the voltage amplitude of the corresponding fundamental color data component, and $V_{off}$ is an offset voltage used to fine tune the offset point to adjust for monitor black level. For a conventional CRT display, the gamma coefficient is typically in the range of 2.35 to 2.55.

As stated previously, sync control mechanism 13, which is shown connected to DSP 31 via control line 65, controls the decision of whether to pass or invert the sampled fundamental red color data component, and performs the toggling operation to effect the same in synchrony with the vertical sync output from signal generator 1, thereby outputting the appropriate voltage signal $V_{OUTR}$.

Thus, in the event the sequencing logic of sync controller 13 requires the red fundamental color data component to be passed unaltered, the incoming digital data $V_{FR}$ is passed through line 38 and output as $V_{OUTR}$ on line 41 to DAC 35, where it is reconverted back to an analog signal. If, on the other hand, the sync controller 13 requires DSP 31 to invert the incoming "red" color data component in accordance with the above formula (i.e., $V_{OUTR}=V_{IR}$), the sampled data is diverted along line 39 where a real-time digital inversion of the incoming data is performed prior to outputting such data along line 41 to DAC 35. In this manner, in response to the established display sequence set by sync controller 13, the "red" DSP 31 either passes or performs an inversion of the incoming fundamental color data component in synchrony with the vertical sync pulse input to sync controller 13 on vertical sync line 15.

The output of DAC 35 thus constitutes a red compound color data component that is comprised of a multiplexation of fundamental and inverted red color data components. This red multiplexed compound color data component is output from DAC 35 into video driver 43, which buffers the output from DAC 35 and sends the data on to the video display 3 along line 21, as shown in FIG. 1.

In like manner, both the green color data component and the blue color data component from the fundamental image signal are simultaneously time multiplexed with their respective corresponding inverted color data component in sync with the system's vertical refresh rate under the control of sync controller 13. The analog green fundamental color data component enters ADC 45 on line 7, where it is converted to a digital signal $V_{FG}$ and input into a "green" DSP 47. DSP 47 is constructed and functions identically to DSP 31, and like nomenclature has been used therein. Thus, a similar green compound color data component is output from DSP 47 and passes through DAC 49 and video driver 51 to the video display 3.

The analog blue fundamental color data component likewise enters ADC 53 on line 9, and is converted to a digital signal $V_{FB}$ which is input into a "blue" DSP 55, also identical to DSP 31. The blue compound color data component output from DSP 55 passes through DAC 57 and video driver 59, where the reconverted analog blue compound color data component is transmitted to video display 3. Similar controllers 61 and 63 are provided for controlling the processing of the digital green and blue color data components, and the respective conversion sampling rates for each.

It is noted that in the basic embodiment shown in FIG. 2, the sequencing logic of controller 13 is set to require alternate inverse encoding of the fundamental and inverse color data components; that is, the respective red, green, and blue fundamental color data components of the fundamental image signal are simultaneously time multiplexed alternately with their corresponding inverted color data components in sync with the vertical refresh rate at a fifty percent (50%) duty cycle. To accomplish this, sync controller 13 sends synchronous alternating signals to DSPs 31, 47, and 55, along control lines 65, 67 and 69, respectively, thereby causing each to toggle repeatedly between fundamental and inverse color data components in sync with the vertical refresh rate of the video system.

Thus, in the basic alternate inverse encoding system, for any given pixel, the relative cyclical display sequence may be represented as shown in the following Table I:

TABLE I

| Red | $R_F$ | $R_I$ | $R_F$ | $R_I$ |
|---|---|---|---|---|
| Green | $G_F$ | $G_I$ | $G_F$ | $G_I$ |
| Blue | $B_F$ | $B_I$ | $B_F$ | $B_I$ |
| Frame | n | n + 1 | n + 2 | n + 3 ... |
| | (1st display cycle) | | (2nd display cycle) | | where $R_F$, $G_F$, and $B_F$, represent the fundamental red, green, and blue color data/color components; $R_I$, $G_I$, and $B_I$, represent the inverted red, green, and blue color data/color components; and the frame period (i.e., vertical refresh rate) for each is designated as n, n+1, n+2, etc.

From the above table it can be seen that the fundamental and inverse color data components corresponding to each pixel are multiplexed alternately in time over the respective frame periods n, n+1, . . . . Thus, relative to each pixel, the average intensity of the compound color components and the compound image formed therefrom can be expressed algebraically as the sum of the fundamental and inverse color components, weighted by the time, $T_F$ and $T_I$, of their relative frame periods:

$$I_{AVG}=T_F(R_F+G_F+B_F)+T_I(R_I+G_I+B_I)$$

For a fifty percent (50%) duty cycle, and $I_I=I_{MAX}-I_F$, where $I_F$, $I_I$, and $I_{MAX}$ represent the fundamental, inverse, and maximum intensity of any individual color component, the average intensity reduces to:

$$I_{AVG}=0.5(R_{MAX}+G_{MAX}+B_{MAX})=0.5(\text{WHITE}_{MAX})=50\% \text{ Gray}$$

The above represents, algebraically, the effect of employing the digital signal processing of signal modifying means 11 shown in FIG. 2. Thus, it can be seen that the time-weighted average intensity of each fundamental color component and corresponding inverse color component at each pixel will be substantially the same ($0.5I_{MAX}$); and, in accordance with the principles of "primary color addition," the human brain will perceive a neutral white (i.e., 50% gray) light of substantially equal intensity at each pixel of the display, thereby rendering the compound image substantially featureless to the naked eye.

Figure 3A:
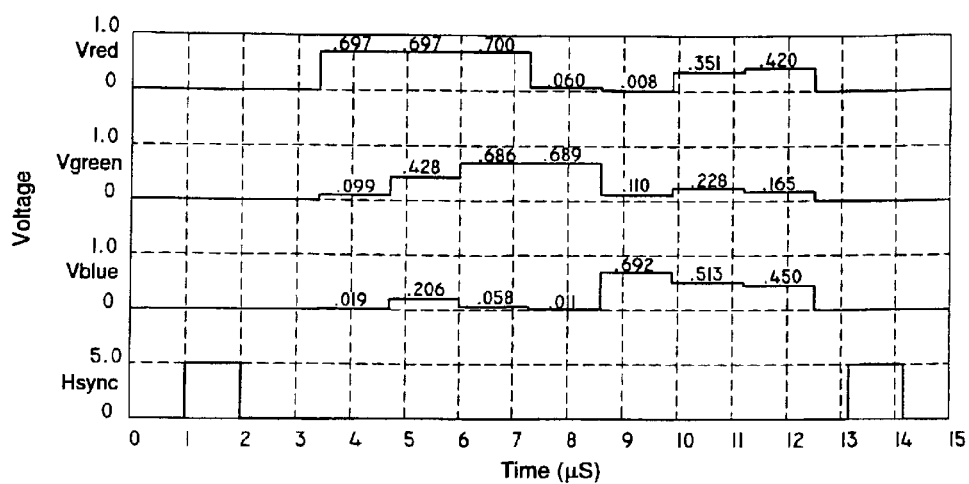
FIG. 3A is a graphical representation of the voltage amplitude of the red, green, and blue color data components corresponding to a fundamental test image as shown at the top of FIG. 4.
Figure 3B:
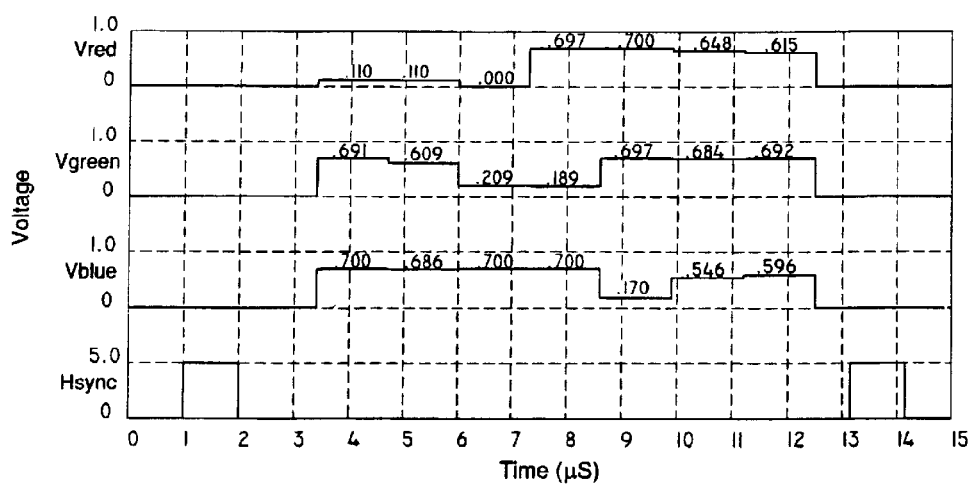
FIG. 3B is a graphical representation of the voltage amplitude of the red, green, and blue inverse color data components corresponding to the fundamental color data components in FIG. 3A, the color depiction of which is shown at the bottom of FIG. 4.
Figure 4:
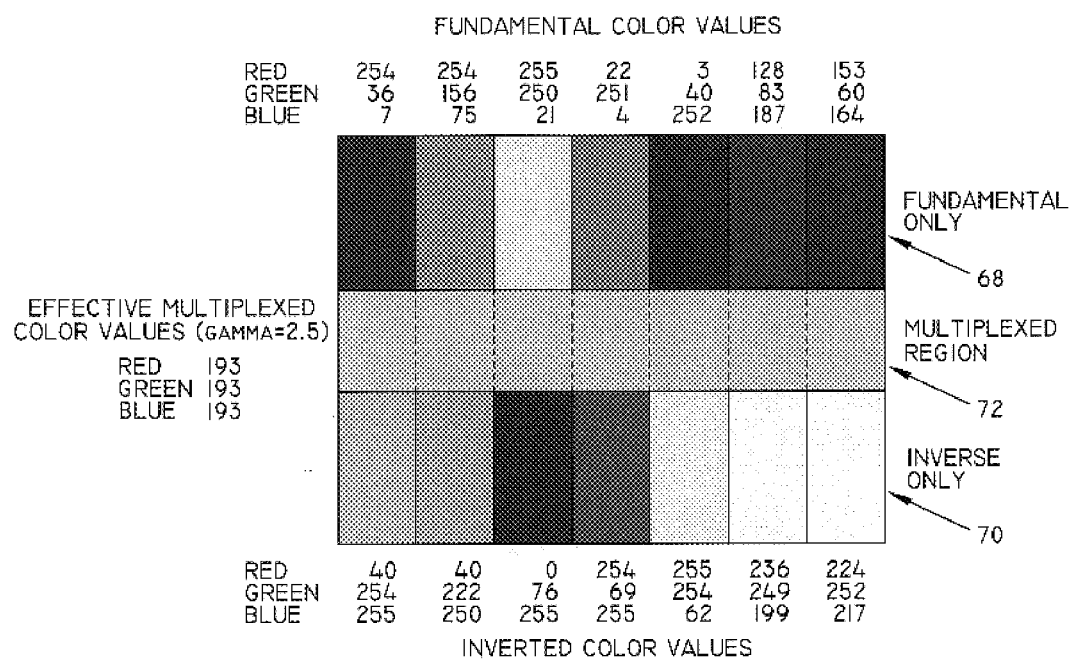
FIG. 4 is a color depiction of the fundamental test image corresponding to the fundamental graphical trace of FIG. 3A, partially overlaid on a color depiction of the corresponding inverse image created by the inverse graphical trace shown in FIG. 3B, thereby creating a substantially featureless resulting compound image at the intersection thereof.

This effect of multiplexing a fundamental image with its calculated inverse, as opposed to its mere complement, is shown best by way of example in FIGS. 3A, 3B, and FIG. 4. The graph of FIG. 3A shows the actual video electric voltage signals, $V_{red}$, $V_{green}$, and $V_{blue}$ of color data components $R_F$, $G_F$, and $B_F$ of a test fundamental image as output from a typical personal computer to a typical CRT monitor ($\gamma$=2.5) on the red, green, and blue signal lines. This fundamental image 68, which is depicted at the top of the color illustration in FIG. 4, is a vertical arrangement of colors of the rainbow selected to demonstrate the effectiveness of the invention.

The graph of FIG. 3A shows the varying red, green and blue voltages for a single horizontal scan line during one display frame period of the test fundamental image. These voltages are generally within the range of 0 to 0.7 volts, and are typically output from a digital-to-analog converter. The magnitude of the signal voltages is shown above each trace on FIG. 3A for each color shown in FIG. 4, while the digital value for each color is shown on FIG. 4. The digital values shown are for a 24-bit system where each of the three color components is represented by 8-bits. For 8 bits of resolution, there are 256 possible levels, represented by 0 to 255. The individual color values printed along the top of FIG. 4 produce the corresponding colors as shown within the fundamental portion of the color illustration.

The graph in FIG. 3B shows the electric voltage signals $V_{red}$, $V_{green}$, and $V_{blue}$ of the corresponding inverse color data components $R_I$, $G_I$ and $B_I$, taking account for the effects of monitor gamma for the same horizontal scan line as depicted in FIG. 3A, during an inverted frame period. This inverted image 70 is shown at the bottom of FIG. 4. The individual digital color values printed along the bottom of FIG. 4 produce the corresponding colors as shown within the inverted portion of the color illustration. This inverted image 70, when alternated with the fundamental image 68 at the display frame refresh rate, results in a compound image 72 that appears 50% gray, and uniformly featureless. This resulting compound 50% gray featureless image 72 is shown graphically at the center of FIG. 4, where the fundamental image and inverted image intersect and overlap in the multiplexed region.

While the above contemplates the use of a fifty percent (50%) duty cycle, the relative frame periods for the fundamental and inverse color data components may vary, provided the "average" duty cycle over a given period of time is maintained at essentially fifty percent (50%). This is so because, at the normal refresh rate of any standard video display, the human eye cannot detect the individual images produced by the fundamental and inverse color data components. Rather, the components detected are blended by the human brain and, provided the average display duty cycle between the fundamental and inverse color components is maintained at essentially fifty percent (50%), one hundred percent (100%) masking over the complete dynamic range of the fundamental image signal may be obtained. Notably, however, since the fundamental color data components are displayed only 50% of the time, the intensity of the fundamental image upon decoding will be reduced accordingly.

In the basic system utilizing alternate inverse encoding, decoding the fundamental image from the featureless compound image may be accomplished with the use of specially adapted LCD (liquid crystal display) shutter eyeglasses 37. As shown in FIG. 2, eyeglasses 37 are connected through control line 71 to sync controller 13, which also controls the multiplexing of DSPs 31, 47, and 55 within signal modifying means 11. Thus, the shutter speed of eyeglasses 37 is synchronized with the multiplexing circuitry of signal modifying means 11, such that upon viewing the display therethrough, the inverse color components of the compound image are effectively blocked from view, thereby allowing passage only of the fundamental color components corresponding to the original fundamental image.

If a greater level of security is desired, it may be obtained by varying the relative display frame periods (duty cycle) of the fundamental and inverse color data components, as discussed above. Without knowledge of the established display cycle, it will be virtually impossible for an unauthorized viewer to decode the fundamental image. Also, since the LCD shutter eyeglasses 37 are controlled by the same signal as that which controls the multiplexing sequence of DSPs 31, 47, and 55, random multiplexing and synchronization may also be employed, which require even more complex schemes of synchronized decoding. Additionally, it is also contemplated that eyeglasses 37 could be adapted to contain a unique electronic security code, or require an access code prior to use, thereby further enhancing the security level of the system.

An alternate means for extracting the fundamental image in the basic alternate inverse encoding scheme is also contemplated wherein variable polarizers may be implemented. This method of image extraction, however, is considered in greater detail in my co-pending application for patent entitled: Image Altering Apparatus and Method For Providing Confidential Viewing of a Fundamental Display Image.

While the basic alternate inverse encoding scheme does offer a high level of security in an economical package, there are still certain limitations present in the system. For instance, it is possible that someone wearing LCD shutter glasses synchronized to another confidential viewing system of the same type might be able to discern certain components of information. Even with random synchronization, there may be a partial overlap, although the image would still be greatly obscured. Additionally, the use of shutter glasses to decode the alternating fundamental and inverse color components may introduce visible display flicker, which can be annoying if below approximately 70 Hz. Thus, in order to avoid this, the above system preferably utilizes a screen refresh rate of at least 140 Hz, which is quite fast, even by today's standards.

In accordance with the present invention, a preferred more advanced alternative system is contemplated that addresses both of the above concerns, which is referred to herein as sequential color inverse encoding. This preferred approach contemplates individually alternating fundamental color components with multiple corresponding inverse components in a sequential fashion. One such approach is shown in the following Table II, wherein it can be seen that the red, green, and blue fundamental color components are sequentially alternated with a pair of corresponding inverse color components in a one-third ($\frac{1}{3}$) duty cycle system (i e., $R_F$, $R_I$, $R_I$).

TABLE II

| Red | $R_F$ | $R_I$ | $R_I$ | $R_F$ | $R_I$ | $R_I$ |
|---|---|---|---|---|---|---|
| Green | $G_I$ | $G_F$ | $G_I$ | $G_I$ | $G_F$ | $G_I$ |
| Blue | $B_I$ | $B_I$ | $B_F$ | $B_I$ | $B_I$ | $B_F$ |
| Frame | n | n + 1 | n + 2 | n + 3 | n + 4 | n + 5 ... |
| | (1st display cycle) | | | (2nd display cycle) | | |

From the above table, it can be seen that for each pixel, the display of each respective fundamental color component, $R_F$, $G_F$, and $B_F$, is not only sequentially alternated with corresponding inverse color components, but is also successively cascaded in time relative to each of the other fundamental color components. In other words, during one complete display cycle, one of the red, green, or blue fundamental color components is displayed at all times, but no two fundamental color components are displayed simultaneously.

Thus, at any given time, there is always present in the featureless compound image one of the fundamental color components of the fundamental image. For this reason, the introduction of flicker caused by the on/off action of LCD shutter glasses, as in the basic alternate inverse encoding system, is completely eliminated in this system; and in fact, LCD shutter glasses will not function to decode the fundamental image, as the use of such glasses requires all fundamental color components to be displayed simultaneously. Thus, a more sophisticated decoding scheme must be used with this preferred alternative system, which will be described in more detail hereafter.

Algebraically, the time-weighted average intensity ($I_{AVG}$) for any given color component in the above one-third (⅓) duty cycle system may be expressed as follows:

$I_{AVG}$=⅓ $I_F$+⅔ $I_I$, where $I_F$ and $I_I$ represent the respective intensities of any given fundamental color component and its corresponding inverse.

As in the basic system, provided the time-weighted average intensity of each fundamental color component and its corresponding inverse color components at each pixel location are maintained substantially equal, the resulting compound image will appear substantially featureless to the naked eye. Moreover, it can also be shown that 100% masking of the fundamental image over the complete dynamic range of $I_F$ may be obtained provided the average intensity $I_{AVG}$ of each color component is equally maintained within the limits of ⅓ $I_{MAX} \leq I_{AVG} \leq$ ⅔ $I_{MAX}$. Stated otherwise, with appropriate selection of the intensity $I_I$ of the inverse color components, the average intensity of the resulting compound image may vary between 33% and 66% gray, and still provide 100% masking of the fundamental image at all pixel locations. For instance, should it be desired that the average intensity of the featureless compound image be either 33%, 50% or 66% gray, the respective intensity levels of each inverse color component may be calculated as follows:

33% gray: $I_I$=½($I_{MAX}$–$I_F$);

50% gray: $I_I$=½(1.5$I_{MAX}$–$I_F$); and

66% gray: $I_I$=½(2$I_{MAX}$–$I_F$).

The ability to vary the average intensity of the featureless compound image display on a pixel-by-pixel basis enables the operator of the system to incorporate features such as overlaid text messages or images within the confidential viewing area. By varying the average intensity level over selected areas (i.e., pixels) of the display, messages such as "SECURE" or "CONFIDENTIAL," or misleading images, may be encrypted into the featureless compound image such that they are readable to the naked eye, but not visible when viewed through the proper eyewear for decoding the fundamental image.

Notably, while 100% masking over the complete dynamic range is obtainable through the use of any of the above inversion coefficients, the brightness or intensity level of the fundamental image upon decoding will be reduced to one-third (⅓) its original brightness. While a one-third (⅓) duty cycle is contemplated, it is noted further that the same results are achievable even with random sequencing and altered frame periods, provided an average duty cycle of one-third (⅓) is maintained. Once again, this is due to the fact that the human brain cannot detect the individual images produced by the fundamental and inverse color components at the normal refresh rate of a standard video display, but rather blends such images.

Figure 5:
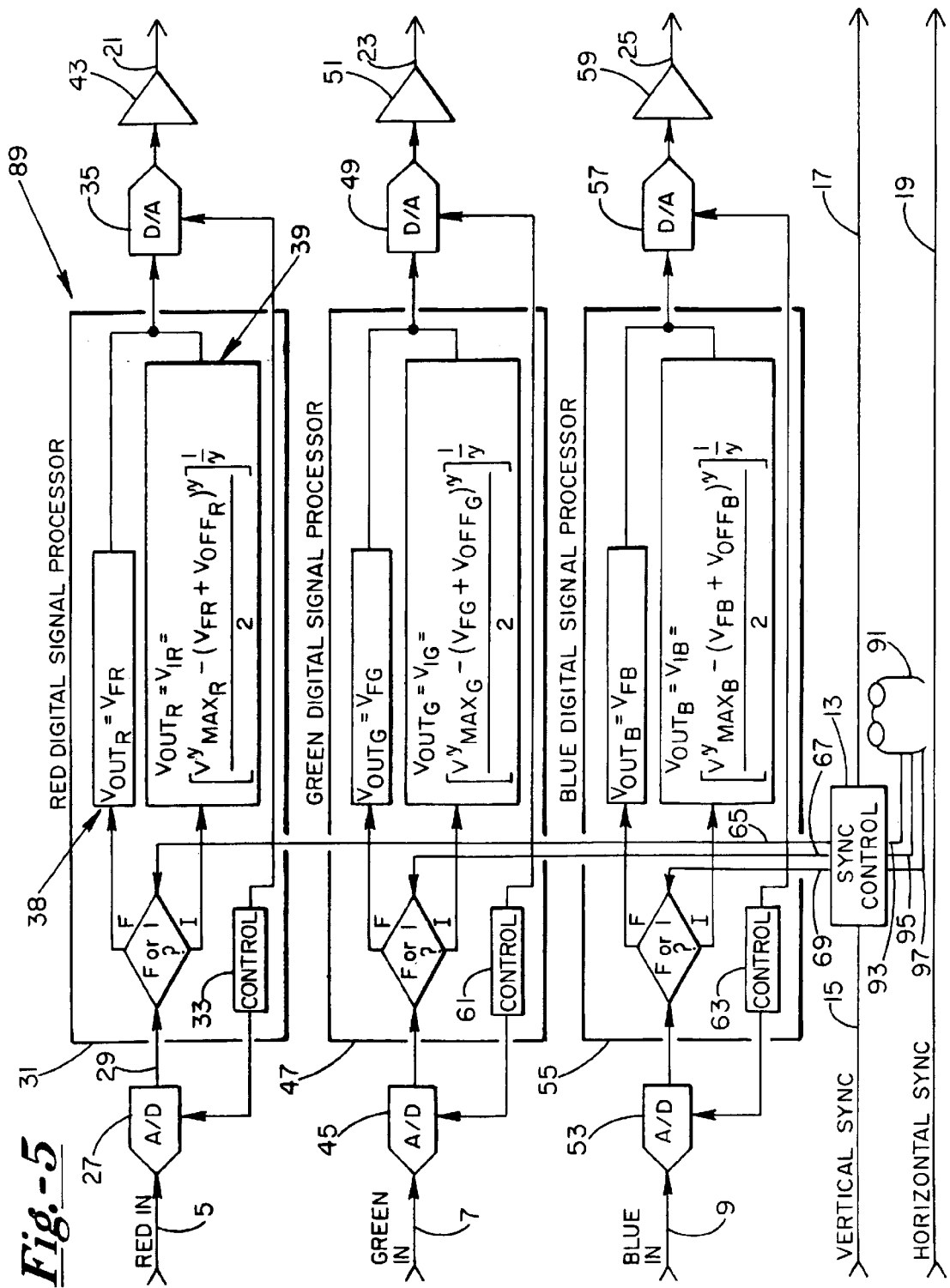
FIG. 5 is a schematic representation of an alternative preferred embodiment of the signal modifying means shown in FIG. 2, utilized to employ sequential color inverse encoding of fundamental and inverse color data components in accordance with the present invention

One implementation of the above system is shown in FIG. 5. As can be seen therein, the signal modifying means 89 of the sequential color inverse encoding scheme is much the same as the signal modifying means 11 in the basic approach previously described, in that similar analog-to-digital conversion and digital signal processing circuitry is used for generating the corresponding fundamental and inverse color data components. Since all components utilized in signal modifying means 89 of FIG. 5 are the same as those used in the basic approach shown in FIG. 2, they have been designated with like numerals. Thus, it can be seen that the respective red, green, and blue fundamental color data components are transmitted from signal generator 1 to signal modifying means 89 along similar input lines 5, 7, and 9. As in the basic approach, each respective color data component passes through an analog-to-digital converter to a digital signal processor, where the incoming signal is processed in accordance with an established sequencing logic and inversion criteria to be described hereafter. Each respective red, green, and blue compound color data component is then output from its corresponding digital signal processor to a digital-to-analog converter, where the data is reconverted back to analog and transmitted through a video driver to video display 3.

Given that this approach operates on a one-third (⅓) duty cycle system (i.e., $R_F$, $R_I$, $R_J$), it will be appreciated that the inversion formula employed in DSP 31, 47, and 55 must be adjusted to apply the appropriate inverse coefficient based on the desired average intensity (i.e., 33% gray) selected for viewing of the resulting compound image. By way of example, the approach shown in FIG. 5 is designed to produce a 33% gray featureless compound image. Recalling that this requires an inverse coefficient $I_I$=½($I_{MAX}$–$I_F$), implementation of this system may be accomplished by resetting the basic inversion formula within controllers 33, 61, and 63 of DSPs 31, 47, and 55 with an appropriate coefficient to adjust the amplitude of the respective inverse color data components so as to provide the desired color intensity. Depending on the desired level of system brightness (i.e., 33%, 50%, 66% gray), the inversion formula may be modified accordingly such that the average intensity $I_{AVG}$ of each color component is equally maintained at any desired level within the limits of ⅓ $I_{MAX} \leq I_{AVG} \leq$ ⅔ $I_{MAX}$, and still provide 100% masking of the fundamental image at all pixel locations. Accounting for monitor gamma (γ), for the average intensity levels previously stated, the corresponding inverse voltage amplitudes are calculated as follows:

$$33\% \text{ gray}: V_{inv} = \left[\frac{V_{\max}^\gamma(V_{fund} + V_{off})^\gamma}{2}\right]^{\frac{1}{\gamma}}$$

$$50\% \text{ gray}: V_{inv} = \left[\frac{1.5V_{\max}^\gamma(V_{fund} + V_{off})^\gamma}{2}\right]^{\frac{1}{\gamma}}$$

$$66\% \text{ gray}: V_{inv} = \left[\frac{2V_{\max}^\gamma(V_{fund} + V_{off})^\gamma}{2}\right]^{\frac{1}{\gamma}}$$

With the desired inverse coefficient appropriately set, multiplexing each respective color data component with its corresponding inverse color data components is accomplished by DSPs 31, 47, and 55 under the control of sync controller 13. As in FIG. 2, each respective DSP in FIG. 5 is connected to sync controller 13 via a separate control line: "red" DSP 31 via line 65; "green" DSP 47 via line 67; and "blue" DSP 55 via line 69. With separate control of the sequencing logic for each DSP, it can be seen that the multiplexing and relative display sequence of each fundamental and inverse color component can be separately controlled through controller 13 in synchrony with the vertical sync pulse input on line 15.

Thus, in accordance with the display sequence shown in Table II, it can be seen that for each pixel, each respective red, green, and blue fundamental color component is sequentially alternated in time with a pair of corresponding scaled inverse color components in a one-third (⅓) duty cycle system. Also, the display sequence of each respective color component is set such that the display of the red, green, and blue fundamental color components are cascaded in time relative to one another, thereby ensuring that one fundamental color component is displayed at all times, yet no two fundamental color components are displayed simultaneously. With this, as seen in Table II, during any given display frame, one fundamental color component will always be displayed at each pixel along with the inverse color components of the other two colors.

Encoded images of the form shown in Table II may be decoded and viewed through eyeglasses that incorporate synchronized sequential color filters similar to the liquid crystal RGB color filters commonly used in field sequential color imaging cameras, or matrix-type filters found on a color LCD screen. In such case, the sequential color filter is synchronized with the appropriate display frame period to allow only the single desired fundamental color component to pass, while blocking the other two inverted color components.

For instance, with reference to Table II, a red sequential color filter is sequentially synchronized to allow $R_F$ to pass in the first frame (n), while blocking the inverted color components $G_I$ and $B_I$. Similarly, in the second frame (n+1), a green color filter in the eyeglasses is sequentially synchronized such that only the green fundamental color component $G_F$ may be viewed; and in the third frame (n+2), a synchronized blue filter allows only the blue fundamental color component to pass. As this cycle is repeated over time, the fundamental image is effectively decoded from the substantially featureless compound image.

To implement this, as shown in FIG. 5, eyeglasses 91 incorporating synchronized sequential color filters are connected in controlled relation to sync controller 13. The same sequencing logic of controller 13 used to control the display of the fundamental and inverse red, green, and blue color data components from DSPs 31, 47, and 55, controls the sequencing of red, green, and blue color filter shutters within eyeglasses 91. The red filter shutter is controlled via signals received on line 93; the green filter shutter is controlled via signals received on line 95; and the blue filter shutter is controlled via signals received on line 97. Thus, the red filter shutter is activated only during the display frame during which the red fundamental color component is displayed, thereby blocking the green and blue inverse color components. Likewise, both the green and blue filter shutters are activated only during the display frame during which the corresponding green and blue fundamental color components are being displayed, effectively blocking the other two inverse color components. Since the red, green, and blue fundamental color components are displayed sequentially during different display frames, the glasses 91 effectively toggle between the respective color filters in sync with the vertical refresh rate, thereby allowing passage of only the fundamental color components.

With the use of such synchronized sequential color filter eyeglasses 91, one fundamental color component is always present, and flicker is eliminated since abrupt intensity changes no longer occur as in the basic approach described previously. Also, this approach provides enhanced security over the basic system in that the encoded image may not be viewed through ordinary LCD shutter glasses, as to do so would result only in partial decoding of the fundamental image. Nor can mere passive color filters decode the fundamental image in the above system, since passive filters will allow both fundamental and inversion components to pass, again maintaining security.

One other means contemplated for enhancing the security of the foregoing inverse encoding schemes is to overlay a misleading visible image on top of the compound substantially featureless image generated thereby. By so doing, all viewers not wearing proper decoding eyewear will be mislead into believing the intended viewer is viewing the visible false image when, in fact, the intended viewer is actually viewing the encoded confidential display. Since the display screen no longer appears to be blank or featureless, curiosity and suspicion levels of unauthorized viewers are consequently reduced, thus enhancing security.

One manner of implementing this is to sequentially alternate the misleading overlay image with the fundamental and inverse image in a ⅓ duty cycle system. As in the previous sequential inverse encoding scheme, the sequencing of the individual red, green, and blue fundamental components, inverse color components, and overlay color components are established such that in any given frame of a display cycle there is always present just one fundamental color component. Such sequencing is shown in the following Table III.

TABLE III

| Red | $R_F$ | $R_I$ | $R_O$ | $R_F$ | $R_I$ | $R_O$ |
|---|---|---|---|---|---|---|
| Green | $G_O$ | $G_F$ | $G_I$ | $G_O$ | $G_F$ | $G_I$ |
| Blue | $B_I$ | $B_O$ | $B_F$ | $B_I$ | $B_O$ | $B_F$ |
| Frame | n | n + 1 | n + 2 | n + 3 | n + 4 | n + 5 ... |
| | (1st display cycle) | | | (2nd display cycle) | | |

From Table III, it can be seen that with this sequencing pattern, each respective fundamental color component alternates with a single corresponding inverse color component during each display cycle. Thus, the intensity of each inverse color component is determined in the same manner as previously described in connection with the basic alternate inverse encoding scheme. Each resulting compound color component is then time multiplexed with a corresponding overlay color component in a ⅓ duty cycle system, thereby effectively causing the fundamental and inverse color components to neutralize each other, leaving only the overlay components visible. All three overlay color components combine to form the misleading overlay image, which appears to be overlaid on top of a 33% gray substantially featureless image.

Such a misleading overlay image may be generated internally within the image signal generator 1, or externally input therein for transmission to the signal modifying means 11 in a manner similar to the fundamental image signal. This image may be static, or dynamic, such as a motion picture input from television, DVD, or other video source. Control of the multiplexing sequence may then be modified via the use of sync controller 13 in accordance with that shown in Table III above. Similarly, through line 71 to eyeglasses 37, the sequence decoding logic may be altered such that eyeglasses 37 block from view all overlay and inverse color components, thus leaving only the fundamental image for confidential viewing.

Another system involving sequential color inverse encoding is also contemplated. This system involves the use of a modified display sequence wherein a plurality of modified fundamental color components are time-multiplexed with a corresponding inverse color component thereof. Once again, using a one-third (⅓) duty cycle system, the modified display sequence for this system is shown in Table IV below:

TABLE IV

| Red | $R_F$ | $R_F$ | $R_I$ | $R_F$ | $R_F$ | $R_I$ |
|---|---|---|---|---|---|---|
| Green | $G_F$ | $G_I$ | $G_F$ | $G_F$ | $G_I$ | $G_F$ |
| Blue | $B_I$ | $B_F$ | $B_F$ | $B_I$ | $B_F$ | $B_F$ |
| Frame | n | n + 1 | n + 2 | n + 3 | n + 4 | n + 5 . . . |
| | (1st Display Cycle) | | | (2nd Display Cycle) | | |

From Table IV it can be seen that for each primary color of the display image, a pair of modified fundamental color components are sequentially multiplexed with a corresponding inverse color component thereof. Moreover, it can be seen that each set of fundamental color components are sequentially offset in time relative to each of the other sets of fundamental color components of the display image. Thus, during any given frame of the display sequence, two independent fundamental color components are displayed along with the inverse color component of the remaining color.

For instance, in the first frame (n) of the display cycle shown in Table IV, the red and green fundamental color components, $R_F$ and $G_F$, are displayed along with the blue inverse color component $B_I$. In the second frame (n+1), the red and blue fundamental color component, $R_F$ and $B_F$, are displayed with the green inverse color component; and in the third frame (n+2), the green and blue fundamental color components $G_F$ and $B_F$, are displayed with the red inverse color component $R_I$.

As is similar with all systems previously described, provided the time-weighted average of the intensities of the fundamental and inverse color components for each respective compound color component (i.e., $R_F+R_F+R_I$) is substantially the same at each pixel location, the resulting compound image will appear substantially featureless to the naked eye. For the modified sequence shown in Table IV above, the average intensity $I_{AVG}$ for any given color component can be calculated as follows:

$I_{AVG}=⅓I_I+⅔I_F$, wherein $I_F$ and $I_I$ represent the respective intensities of any given fundamental color component and its corresponding inverse.

As can be seen from Table IV, use of this modified sequence guarantees the presence of two fundamental color components at all times. For this reason, this system has the advantage that the resulting decoded fundamental image will retain two-thirds (⅔) its original brightness, and there will be essentially no flicker visible to the viewer.

However, the above system does have limitations. Although the average intensity of the resulting compound image can be selectively varied as in the previous system, it can be shown that 100% masking of the fundamental image may only occur over 50% of the dynamic range of the fundamental signal, unless the fundamental signal is compressed before encoding the same. For instance, for a substantially featureless 33% gray compound image, complete masking will only occur for fundamental intensity values in the range of $0 \leq I_F \leq ½I_{MAX}$. For a 50% gray system, fundamental intensity values must be maintained between $¼I_{MAX} \leq I_F \leq ¾I_{MAX}$ in order to obtain 100% masking; and for a 60% gray system, fundamental intensity values must be maintained between $½I_{MAX} \leq I_F \leq I_{MAX}$ in order to obtain 100% masking. Beyond these values, masking will still occur, but at less than 100%. Depending on the application or use involved, masking over only 50% of the full dynamic range may be sufficient.

Similar to the previously described sequential color inverse encoding scheme, this alternative approach may also be readily implemented with relatively minor modifications to the basic alternate inverse encoding scheme described previously. In such case, proper sequencing of the fundamental and inverse color data components in accordance with that shown in Table IV above can be effected with modifications to the sequencing logic established by controller 13. Moreover, appropriate scaling and/or compression of incoming fundamental and inverse color data components may be readily accomplished within the corresponding digital signal processor for each color, similar to that in the previous embodiment involving sequential color inverse encoding. This will ensure that the time-weighted average of the intensities of the fundamental and inverse color components for each respective compound color component is substantially the same at each pixel location, thereby rendering the resulting compound image substantially featureless to the naked eye. In all other respects, implementation of the sequencing pattern of Table IV is accomplished in the same manner as that shown in Table II, utilizing the same signal modifying means 89 shown in FIG. 5.

Images encoded as shown in Table IV above may also be viewed using eyeglasses incorporating synchronized sequential color filters. However, unlike the foregoing embodiment which utilizes more common RGB color filters, encoded images of the form shown in Table IV require the use of synchronized sequential complementary filters; that is, filters that are the color complement of the primary colors red, green, and blue. This is so because, at any instant of time, there is but one distinct inverse color component being displayed, which can be effectively blocked from viewing by a filter of its color complement. Hence, by synchronizing the eyeglasses for viewing through a filter that is the color complement of the single inverse color component being displayed, the remaining two fundamental color components are allowed to pass, thereby decoding the fundamental image.

By way of example, during the first frame (n) of the sequence shown in Table IV, each pixel of the compound image displays the red and green fundamental color components, $R_F$ and $G_F$, with a blue inverse color component $B_I$. Thus, with reference to FIG. 5, in order to view only the red and green fundamental color components during this frame period, a yellow (blue complement) filter shutter within eyeglasses 91 is synchronized with the output of DSP 55 via signals received on line 97 to block the blue inverse color component $B_I$. In the same manner, a magenta (green complement) color filter in eyeglasses 91 is synchronized with the output of DSP 47 via control signals received from sync controller 13 on line 95 to block the green inverse color component $G_I$ in the second frame period (n+1); and likewise, a cyan (red complement) color filter is synchronized with the output of DSP 31 via control signals received on line 93 from sync controller 13 to block the red inverse color component $R_I$ in the third frame period (n+2).

Thus, it can be seen that through one complete display cycle of a one-third (⅓) duty cycle system, complementary yellow, magenta and cyan filters within the decoding eyeglasses are sequentially alternated in the same manner as previously discussed, in sync with the respective first, second, and third frame periods so as to allow passage and decoding of the fundamental color components of the original fundamental image. When properly synchronized, the compound image is fully decoded, leaving only the fundamental image to be seen by the viewer.

As still another alternative embodiment, an additional image encoding system is contemplated which involves a combination of the basic alternate inverse and more advanced sequential color inverse encoding systems previously described. Similar to the preferred basic system, in this alternative system, each of the fundamental color components of the fundamental image are displayed alternately with a corresponding inverse color component in a 50% duty cycle system. However, as in the sequential color inverse encoding schemes, one of the fundamental color components is displayed out of sync with the remaining fundamental color components, such that all fundamental color components are never displayed simultaneously. In other words, one fundamental color component is alternated with its corresponding inverse color component in reverse order relative to the other two fundamental color components. This system gives rise to three possible combinations of display sequences, as shown in the following Tables V, VI, and VII:

TABLE V

| Red | $R_F$ | $R_I$ | $R_F$ | $R_I$ |
|---|---|---|---|---|
| Green | $G_I$ | $G_F$ | $G_I$ | $G_F$ |
| Blue | $B_F$ | $B_I$ | $B_F$ | $B_I$ |
| Frame | n | n + 1 | n + 2 | n + 3 ... |
| | (1st Display Cycle) | | (2nd Display Cycle) | |

TABLE VI

| Red | $R_F$ | $R_I$ | $R_F$ | $R_I$ |
|---|---|---|---|---|
| Green | $G_F$ | $G_I$ | $G_F$ | $G_I$ |
| Blue | $B_I$ | $B_F$ | $B_I$ | $B_F$ |
| Frame | n | n + 1 | n + 2 | n + 3 |
| | (1st Display Cycle) | | (2nd Display Cycle) | |

TABLE VII

| Red | $R_I$ | $R_F$ | $R_I$ | $R_F$ |
|---|---|---|---|---|
| Green | $G_F$ | $G_I$ | $G_F$ | $G_I$ |
| Blue | $B_F$ | $B_I$ | $B_F$ | $B_I$ |
| Frame | n | n + 1 | n + 2 | n + 3 |
| | (1st Display Cycle) | | (2nd Display Cycle) | |

Regardless of which display sequence is used, this approach offers many of the benefits of the preferred basic system, as well as the more advanced sequential color inverse encoding systems. Algebraically, this system is similar to the basic system in that the average intensity, $I_{AVG}$, can be expressed as follows:

$I_{AVG}=0.5I_F+0.5I_I$, where $I_F$ and $I_I$ represent the respective intensities of any given fundamental color component and its corresponding inverse.

As in the basic system, the above display sequence will result in a 50% gray substantially featureless compound image which offers 100% masking over the complete dynamic range of the fundamental image signal. Since this approach is a 50% duty cycle system, the decoded fundamental image will be 50% its original brightness.

Like the more advanced sequential color inverse encoding system, this system is highly secure and has substantially reduced flicker due to the fact that one fundamental color component is always sequentially altered in time relative to the other fundamental color components. This ensures that at least one fundamental color component is always present during each frame period of every display cycle. Notably, while this system offers sequential color inverse encoding, it still operates on a 50% duty cycle system, and therefore can operate 33% faster than the advanced sequential color inverse encoding schemes previously described that operate on a one-third ($\frac{1}{3}$) duty cycle system. With a faster operating speed, this system will provide even less display flicker than those previously described.

External implementation of the above system using combined alternate inverse and sequential color inverse encoding is identical to that of the basic alternate inverse encoding scheme shown in FIG. 2, with the exception that the multiplexing sequencing pattern of each color data component and its corresponding inverse component, as controlled by sync controller 13, is alternated in accordance with the selected display sequence of either Table V, VI, or VII above. For this reason, discussion of this alternative embodiment will be made with reference to FIG. 2.

As stated previously, this encoding scheme requires a 50% alternating duty cycle of each respective color data component. Thus, the controller 33, 61, and 63 of respective DSPs 31, 47, and 55 are set to apply the same inversion formula as that established in the basic alternate inverse approach shown in FIG. 2. However, depending on the desired display sequence selected from Tables V, VI, or VII, one color component is always out of sync with the remaining two color components. For instance, to implement the display sequence of Table V, transmission of the green fundamental color data component through DSP 47 to monitor 3 is one display frame out of sync with the transmission of the red and blue fundamental color data components through DSPs 31 and 55. Hence, during one display frame (n), sync controller 13 instructs DSPs 31 and 55 via control lines 65 and 69 to pass the red and blue fundamental color data components, while simultaneously instructing DSP 47, via control line 67, to pass an inverted green color data component. In the next display frame (n+1), sync controller 13 instructs DSPs 31 and 55 to perform an inversion of the red and blue fundamental color data components before passing the same to monitor 3, while at the same time instructing DSP 47 to pass the green fundamental color data component unaltered. This process is continually repeated on a 50% alternating duty cycle, such that the green fundamental color data component is always transmitted out of sync with the red and blue fundamental color data components, and the time-weighted average intensity of each color component and its inverse at each pixel is maintained substantially equal. By so doing, the resulting compound image appears substantially featureless to the naked eye.

Similarly, to implement the display sequence of Table VI, during one display frame, sync controller 13 acts to simultaneously cause DSPs 31 and 47 to pass the red and green fundamental color data components to monitor 3 along with the inverse blue color data component from DSP 55. In the next display frame, sync controller 13 causes DSP 55 to transmit the blue fundamental color data component simultaneously with inverted red and green color data components from DSPs 31 and 47. Again, by repeating this sequence pattern on a 50% alternating duty cycle, the time-weighted average intensity of each color component and its inverse at each pixel will be substantially the same, and the resulting compound image will appear substantially featureless to the naked eye.

In like manner, the display sequence of Table VII may also be readily employed. In this case, DSPs 47 and 51 are instructed by sync controller 13 to simultaneously transmit during one frame the green and blue fundamental color data components with an inverse red color data component from DSP 31. In the next frame, the red fundamental data component from DSP 31 is caused to be transmitted along with inverted green and blue color data components to monitor 3. Repeating this alternating display sequence on a 50% duty cycle will ensure that the red fundamental color data component is always one display frame out of sync with the green and blue fundamental color data components, resulting in a highly secure compound image that appears substantially featureless to the naked eye.

Since this system requires one of the fundamental color components to always be out of sync with the remaining fundamental color components, decoding of the fundamental image requires the use of synchronized sequential color filters, as in the more advanced systems described previously. However, since this system operates on a 50% duty cycle, it is evident that the decoding eyeglasses used in this approach require only two (2) alternating color filters, or a single filter which can alternate between two colors. As will be shown hereafter, decoding of the fundamental image from any of the modified display sequences shown in Tables V, VI, and VII above can be accomplished with viewing glasses that incorporate synchronized sequential primary/complementary filter pairs.

With specific reference to the display sequence shown in Table V, it can be seen that during the first frame period, the red and blue fundamental color components, $R_F$ and $B_F$, at each pixel location, are displayed with a green inverse color component $G_I$. Thus, to decode the fundamental color components during this frame period, the decoding eyeglasses 37 must be synchronized for viewing through a magenta (green complement) color filter. During the second frame period (n+1), however, only the green fundamental color component $G_F$ of the fundamental image is displayed, which may be decoded with a synchronized green primary color filter.

From the above, it is evident that through the use of properly synchronized eyeglasses having alternating green/magenta filter pairs, the fundamental image may be readily decoded from the substantially featureless compound image. Thus, as in the alternate inverse encoding scheme of FIG. 2, eyeglasses 37 receive control signals from sync controller 13 along line 71, which causes eyeglasses 37 to alternate between green and magenta color filter shutters in sync with the vertical refresh rate of the display system, such that upon viewing the display therethrough, only the fundamental color components of the original fundamental image are allowed to pass. In the same manner, it can be seen that the fundamental image can be readily decoded from the display sequence shown in Table VI, through the use of eyeglasses 37 incorporating synchronized alternating blue/yellow filter pairs; and decoding of the fundamental image from the display sequence shown in Table VII may be accomplished with the use of eyeglasses 37 incorporating synchronized alternating red/cyan filter pairs.

Although implementation of each of the foregoing inverse encoding schemes has been described via the use of external hardware, implementation of such sequencing schemes may also be accomplished internally within the video display adapter circuitry of a standard personal computer. In general, video display adapters, commonly referred to as video cards, contain memory which is used to store a digital, or numeric, representation of the image to be displayed on the video display. Current video display adapters typically employ VRAM (video random access memory) or dual port RAM, which can be written to and read from simultaneously. This allows the digital data to be written to the video memory whenever it is desired to change the images, and to be read from the memory at whatever refresh rate is utilized.

The image stored within the video memory is output to the display monitor at the video refresh rate either via look-up tables (i.e., palette registers) or directly to digital-to-analog converters contained within the display adapter. The digital data stored within the memory typically represents either the color at each individual pixel location or the intensities of the individual red, green, and blue color data components for each pixel location within the image. In the case of storing pixel color values, the color values are compared with a look-up table in the palette register, which then outputs the individual red, green, and blue color data component values to the digital-to-analog converters. When the individual color data component values are utilized, they are output directly to the digital-to-analog converters without the use of a look-up table.

Depending on the sequencing pattern selected, with internal implementation, the video memory can be written to with alternating or sequential fundamental and inverse digital data (and if appropriate, overlay digital data), or additional data memory utilized, so that the signal outputs are controlled directly without the use of external implementation. Color inverse values determined from any of the aforementioned formulas can be calculated by the system's central processing unit (CPU), within the video display adapter circuitry, or elsewhere within the system. Alternatively, additional look-up tables containing pre-calculated color inverse values and, where appropriate, overlay values can be utilized. Alternate fundamental and inverse images would then be obtained by alternating between look-up tables with each frame in accordance with the desired sequencing pattern. Additionally, the appropriate inverse color data component values could also be mathematically calculated before inputting to the digital-to-analog converters.

Figure 6:
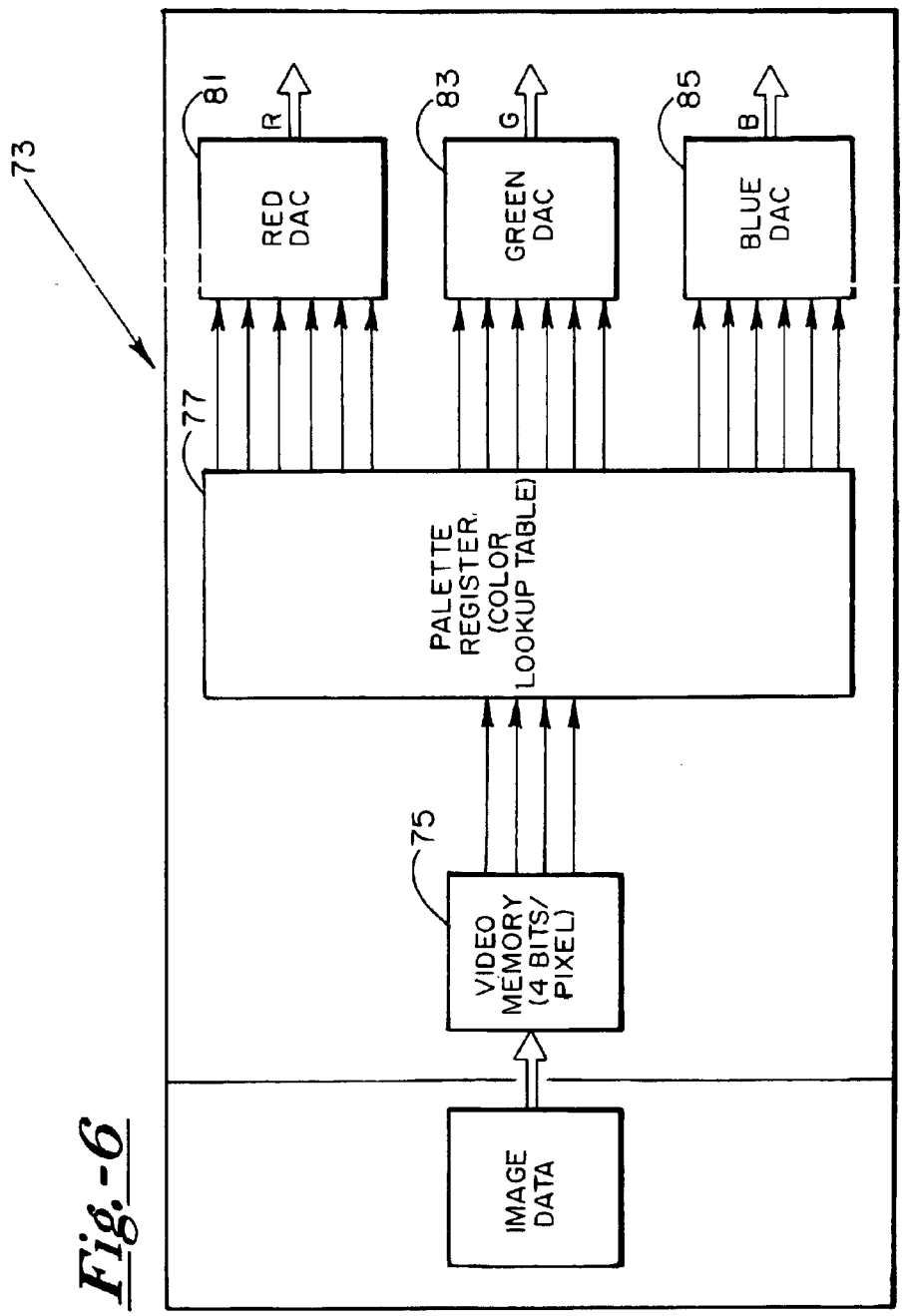
FIG. 6 is a diagrammatic representation of a typical video graphics adapter of a display system which may be utilized to implement signal modification and control the multiplexing sequence of fundamental and inverse color data components internally within a computer system in accordance with the present invention.

To further illustrate the above, a standard 16-color video display adapter 73, commonly known as a video graphics adapter (VGA), is considered in FIG. 6. The image data generated by the CPU relative to each pixel is stored in memory 75 as a 4-bit digital color value, where it is transferred to a palette register 77 and converted to an eighteen (18) bit signal comprised of the three color data components, red, green, and blue (6 bits per color). Thus, as shown in look-up table 79 in FIG. 6A, each standard default 4-bit color value of the palette contents is represented as a specific intensity level of red, green, and blue ranging between zero (0) and sixty-three (63), where a zero (0) represents that none of that particular color component is to be displayed at a given pixel, and a sixty-three (63) represents that a maximum amount of that particular color component is to be displayed at a given pixel location. Each red, green, and blue color data component contained within palette register 77 is then input to a corresponding digital-to-analog (DAC) converter 81, 83, and 85, respectively, where the components are converted to analog and output to the display monitor 3.

For a system utilizing multiple look-up tables, the contents of the additional palette registers would contain the corresponding color inverse and/or overlay values. By way of example, color inverse values for the basic alternate inverse encoding scheme would appear as shown in Table 87 of FIG. 6B. Here the same 16 colors have been substituted with their numeric color inverse data component values, taking into account the affects of monitor gamma. By alternating look-up tables between frames, the image becomes featureless as in the approach of FIG. 2. The method previously shown to be implemented externally of the personal computer has now been shown to be implemented internally with the system's video display adapter. Schemes for extending to greater color depths (more bits) and more complicated sequencing patterns logically follow from the above.

With the appropriate inverse color component values being calculated by the computer system or, alternatively, stored within look-up tables contained within the video graphics adapter, any desirable sequencing scheme, such as the above described alternate color inverse encoding scheme, sequential color inverse encoding schemes, random sequencing schemes, or combined alternate/sequential color encoding schemes, may be readily implemented with the use of internal system software to selectively output the appropriate fundamental and inverse color data components to the display monitor. Regardless of whether the color inverse values are calculated by the computer system or precalculated and stored in a second look-up table within the video display adapter, selection of any of the above described sequencing patterns, with or without an overlay image, may be readily implemented and controlled through the system software.

With such internal digital implementation, the average intensity of the resulting compound image may be controlled on a pixel-by-pixel basis, thereby providing additional desirable enhancements, such as the feature of gray-scale adjustability discussed previously, wherein overlying messages as "CONFIDENTIAL" or "SECURE," or misleading images, may be encrypted into the featureless compound image. Another desirable feature is the ability to have scalable and windowable confidential viewing areas. By controlling masking of the fundamental image on a pixel-by-pixel basis, confidential viewing windows of smaller compass than the display screen as a whole may be designated and scaled to a desirable size, thereby enabling a user of the system to maintain only selected portions of the display as confidential.

It will, of course, be understood that various changes may be made in the form, details, arrangement, and proportions of the parts without departing from the scope of the invention which comprises the matter shown and described herein and set forth in the appended claims.

What is claimed is:

1. An image altering apparatus for providing confidential viewing of a fundamental display image by a viewer, comprising:
    a. a display comprised of a plurality of pixels;
    b. means for generating a fundamental image on said display, said fundamental image having a plurality of fundamental color components corresponding to each of said pixels;
    c. Beans for modifying said fundamental image to generate a compound image on said display which is substantially featureless and renders said fundamental image non-viewable to the naked eye, said compound image including a plurality of compound color components corresponding to each of said pixels;
    d. each of said compound color components being comprised of at least one said fundamental color component of a predetermined intensity and wavelength, time multiplexed with at least one corresponding related color component of the same said wavelength;
    e. said plurality of compound color components corresponding to each of said pixels having a display sequence characterized in that at least one of said fundamental color components is always displayed out of time-phase with the remainder of said fundamental color components corresponding to the same said pixel; and
    f. Beans for extracting said fundamental image from said compound for viewing only by the viewer on said display.

2. The image altering apparatus of claim 1, wherein each of said related color components constitutes an inverse color component of its corresponding said fundamental color component.

3. The image altering apparatus of claim 2, wherein each said compound color component is comprised of at least one said fundamental color component, time multiplexed alternately with at least one corresponding said inverse color component thereof.

4. The image altering apparatus of claim 2, wherein each said compound color component is comprised of at least one said fundamental color component, time multiplexed randomly with at least one said corresponding inverse color component thereof.

5. The image altering apparatus of claim 3, wherein said plurality of compound color components corresponding to each of said pixels have a cyclical display sequence characterized in that at least one said fundamental color component of one of said compound color components is out of time-phase with said fundamental color components of other said compound color components corresponding to the same said pixel.

6. The image altering apparatus of claim 2, wherein each said compound color component is comprised of at least one said fundamental color component, time multiplexed sequentially with at least one said inverse color component thereof.

7. The image altering apparatus of claim 6, wherein each said fundamental color component of each of said compound color components for each said pixel is time multiplexed with a corresponding said inverse color component in succession relative to each said fundamental color component of other said compound color components corresponding to the same said pixel.

8. The image altering apparatus of claim 6, wherein said plurality of compound color components at each of said pixels have a cyclical display sequence characterized in that at least one said fundamental color component of one of said compound color components is out of time-phase with said fundamental color components of other said compound color components corresponding to the same said pixel.

9. The image altering apparatus of claim 6, wherein said plurality of compound color components at each of said pixels have a cyclical display sequence characterized in that at least one said inverse color component of one of said compound color components is out of time-phase with said inverse color components of other said compound color components corresponding to the same said pixel.

10. The image altering apparatus of claim 2, 3, 4, 5, 6, 7, 8, or 9, wherein said means for extracting said fundamental image includes at least one color filter, time-synchronized to block each said inverse color component of said compound image from the view of the viewer.

11. The image altering apparatus of claim 2, wherein said means for modifying said fundamental image includes electronic circuitry capable of generating a compound image signal representative of said compound image, said compound image signal having a plurality of compound color data components which are composed of at least one fundamental color data component, time multiplexed with at least one corresponding inverse color data component thereof, wherein each said fundamental color data component and corresponding said inverse color data component are representative of one said fundamental color component and corresponding said inverse color component, respectively, of said compound image.

12. The image altering apparatus of claim 2, including means for generating an overlay image on said display, said overlay image having at least one overlay color component time multiplexed with a corresponding said compound color component to produce an image visible to the naked eye which appears to be overlaid on said substantially featureless compound image.

13. The image altering apparatus of claim 12, wherein said overlay image includes a plurality of overlay color components corresponding to each of said pixels, at least one of said overlay color components of said overlay image being displayed out of time-phase with the remainder of said overlay color components corresponding to the same said pixel.

14. An image altering apparatus for providing confidential viewing of a fundamental display image by a viewer, comprising:
  a. a display comprised of a plurality of pixels;
  b. Beans for generating a fundamental image signal having a plurality of fundamental color data components corresponding to each of said pixels, each said fundamental color data component being representative of a fundamental color component of a fundamental image;
  c. Beans for modifying said fundamental image signal to generate a compound image signal having a plurality of compound color data components corresponding to each of said pixels;
  d. each of said compound color data components being comprised of at least one said fundamental color data component of a predetermined amplitude, time multiplexed with at least one corresponding inverse color data component thereof, wherein each said inverse color data component has an amplitude which is determined as a function of said amplitude of said corresponding fundamental color data component and is representative of an inverse color component having the same wavelength of said fundamental color component corresponding thereto, such that transmission of said compound image signal to said pixels will produce a substantially featureless image on said display;
  e. Beans for transmitting said compound image signal to said pixels thereby displaying said substantially featureless image to the viewer on said display;
  f. said plurality of compound color data components corresponding to each of said pixels having a display sequence characterized in that at least one said fundamental color data component of one of said compound color data components is out of time-phase with said fundamental color data components of other said compound color data components corresponding to the same said pixel; and
  g. means for extracting said fundamental image from said substantially featureless image for viewing on said display only by the viewer.

15. The image altering apparatus of claim 14, wherein each said inverse color data component of a corresponding said fundamental color data component is representative of a corresponding inverse color component, and said amplitude of each said inverse color data component is determined such that the time-weighted average of the intensity of all said fundamental color components and said corresponding inverse color components thereof is substantially the same for each of said pixels.

16. The image altering apparatus of claim 14, wherein said plurality of pixels cover only a portion of said display.

17. The image altering apparatus of claim 14, wherein each said inverse color data component is representative of an inverse color component of said substantially featureless image, and said means for extracting said fundamental image includes means for blocking each said inverse color component of said substantially featureless image from the view of the viewer.

18. The image altering apparatus of claim 17, wherein said means for extracting said fundamental image includes at least one color filter, time synchronized to block each said inverse color component of said substantially featureless image from the view of the viewer.

19. The image altering apparatus of claim 14, wherein each of said compound color data components is comprised of at least one said fundamental color data component, time multiplexed alternately with at least one corresponding said inverse color data component thereof.

20. The image altering apparatus of claim 14, wherein each of said compound color data components is comprised of at least one said fundamental color data component, time multiplexed sequentially with at least one said inverse color data component thereof.

21. The image altering apparatus of claim 14, wherein each of said compound color data components is comprised of at least one said fundamental color data component, time multiplexed sequentially with a plurality of said inverse color data components thereof.

22. The image altering apparatus of claim 20, wherein said means for modifying said fundamental image signal individually alternates at least one said fundamental color and corresponding inverse color data component in a sequential manner relative to at least one other said fundamental color and corresponding inverse color data components of the same said pixel.

23. The image altering apparatus of claim 21, wherein each said fundamental color data component of each of said compound color data components for each of said pixels is time multiplexed with a corresponding said inverse color data component in cascading order relative to each said fundamental color data component of other said compound color data components corresponding to the same said pixel.

24. The image altering apparatus of claim 22 or 23, wherein each said inverse color data component is representative of an inverse color component of said substantially featureless image, and said means for extracting said fundamental image includes at least one color filter, time synchronized to block each said inverse color component of said featureless image from the view of the viewer.

25. The image altering apparatus of claim 14, wherein each of said compound color data components is comprised of a plurality of fundamental color data components representative of one said fundamental color component of said fundamental image.

26. The image altering apparatus of claim 25, wherein said plurality of fundamental color data components of each of said compound color data components are time multiplexed sequentially with at least one inverse color data component thereof.

27. The image altering apparatus of claim 26, wherein said plurality of compound color data components at each of said pixels have a cyclical display sequence characterized in that at least one said inverse color data component of one of said compound color data components is out of time-phase with said inverse color data components of other said compound color data components corresponding to the same said pixel.

28. The image altering apparatus of claim 27, wherein each said inverse color data component is representative of an inverse color component of said substantially featureless image, and said means for extracting said fundamental image includes at least one color filter, time synchronized to block each said inverse color component of said substantially featureless image from the view of the viewer.

29. The image altering apparatus of claim 14, wherein each of said compound color data components is comprised of at least one said fundamental color data component, time multiplexed randomly with at least one corresponding said inverse color data component.

30. The image altering apparatus of claim 14, including means for generating an overlay image signal, said overlay image signal having at least one overlay color data component time multiplexed with a corresponding said compound color data component to produce an image on said display which is visible to the naked eye, and which appears to be overlaid on said substantially featureless image.

31. The image altering apparatus of claim 30, wherein each said compound color data component corresponding to each said pixel has a corresponding overlay color data component which is sequentially transmitted to said pixel relative to other said overlay color data components corresponding to the same said pixel.

32. The image altering apparatus of claim 30, wherein said overlay image signal includes a plurality of overlay color data components corresponding to each of said pixels, and at least one of said overlay color data components is always transmitted to each of said pixels out of time-phase with the remainder of said overlay color data components corresponding to the same said pixel.

33. An image altering apparatus for providing confidential viewing of a fundamental display image by a viewer, comprising:
 a. a display comprised of a plurality of pixels;
 b. means for generating a fundamental image signal having a plurality of fundamental color data components corresponding to each of said pixels, each said fundamental color data component being representative of a fundamental color component of a fundamental image;
 c. means for modifying said fundamental image signal to generate a compound image signal having a plurality of compound color data components corresponding to each of said pixels;
 d. each of said compound color data components being comprised of at least one said fundamental color data component of a predetermined amplitude, time multiplexed with at least one corresponding inverse color data component thereof, said fundamental color data component and corresponding said inverse color data component of at least one of said compound color data components for each of said pixels having a display sequence that is out of time-phase with that of other said compound color data components corresponding to the same said pixel;
 e. each said inverse color data component being representative of an inverse color component of the same wavelength as a corresponding said fundamental color component and having an amplitude that is determined as a function of said amplitude of said corresponding fundamental color data component thereto, such that the time-weighted average of the intensities of all said fundamental color components and corresponding said inverse color components is substantially equal for each of said pixels of said display;
 f. means for transmitting said compound image signal to said pixels, thereby displaying a substantially featureless image composed of said fundamental and inverse color components to the viewer on said display; and
 g. means for extracting said fundamental image from said substantially featureless image for viewing on said display only by the viewer.

34. The image altering apparatus of claim 33, wherein said plurality of compound color data components corresponding to each of said pixels have a cyclical display sequence determined in accordance with the following table:

| $R_F$ | $R_I$ | $R_I$ |
| $G_I$ | $G_F$ | $G_I$ |
| $B_I$ | $B_I$ | $B_F$ | a. were $R_F$, $G_F$, and $B_F$ represent said fundamental color data components corresponding to the colors red, green and blue, respectively, of said fundamental color components of said fundamental image; and
 b. where $R_I$, $G_I$, and $B_I$ represent corresponding re, green and blue said inverse color data components of said fundamental color data components $R_F$, $G_F$, and $B_F$, respectively.

35. The image altering apparatus of claim 34, wherein said means for extracting said fundamental image from said substantially featureless image includes red, green, and blue colored filters, time synchronized with said display sequence of said compound color data components to block each said inverse color component of said substantially featureless image from the view of the viewer.

36. The image altering apparatus of claim 33, wherein said plurality of compound color data components corresponding to each of said pixels have a cyclical display sequence determined in accordance with the following table:

| $R_F$ | $R_F$ | $R_I$ |
| $G_F$ | $G_I$ | $G_F$ |
| $B_I$ | $B_F$ | $B_F$ | a. where $R_F$, $G_F$, and $B_F$ represent said fundamental color data components corresponding to the colors red, green and blue, respectively, of said fundamental color components of said fundamental image; and
 b. where $R_I$, $G_I$, and $B_I$ represent corresponding red, green and blue said inverse color data components of said fundamental color data components $R_F$, $G_F$, and $B_F$, respectively.

37. The image altering apparatus of claim 36, wherein said means for extracting said fundamental image from said substantially featureless image includes yellow, magenta, and cyan colored filters, time synchronized with said display sequence of said compound color data components to block each said inverse color component of said substantially featureless image from the view of the viewer.

38. The image altering apparatus of claim 33, wherein said plurality of compound color data components corresponding to each of said pixels have a cyclical display sequence determined in accordance with the following table:

| | |
|---|---|
| $R_F$ | $R_I$ |
| $G_I$ | $G_F$ |
| $B_F$ | $B_I$ | a. where $R_F$, $G_F$, and $B_F$ represent said fundamental color data components corresponding to the colors red, green and blue, respectively, of said fundamental color components of said fundamental image; and b. where $R_I$, $G_I$, and $B_I$ represent corresponding red, green and blue said inverse color data components of said fundamental color data components $R_F$, $G_F$, and $B_F$, respectively.

39. The image altering apparatus of claim 38, wherein said means for extracting said fundamental image from said substantially featureless image includes at least one color filter, time synchronized with said display sequence of said compound color data components to block said inverse color components of said substantially featureless image from the view of the viewer.

40. The image altering apparatus of claim 39, wherein said means for extracting said fundamental image includes a magenta colored filter and a green colored filter which alternate in sync with said display sequence of said compound color data components to block said inverse color components of said substantially featureless image from the view of the viewer.

41. The image altering apparatus of claim 33, wherein said plurality of compound color data components corresponding to each of said pixels have a cyclical display sequence determined in accordance with the following table:

| | |
|---|---|
| $R_F$ | $R_I$ |
| $G_F$ | $G_I$ |
| $B_I$ | $B_F$ | a. where $R_F$, $G_F$, and $B_F$ represent said fundamental color data components corresponding to the colors red, green and blue, respectively, of said fundamental color components of said fundamental image; and b. where $R_I$, $G_I$, and $B_I$ represent corresponding red, green and blue said inverse color data components of said fundamental color data components $R_F$, $G_F$, and $B_F$, respectively.

42. The image altering apparatus of claim 41, wherein said means for extracting said fundamental image from said substantially featureless image includes at least one color filter, time synchronized with said display sequence of said compound color components to block said inverse color components of said substantially featureless image from the view of the viewer.

43. The image altering apparatus of claim 42, wherein said means for extracting said fundamental image includes a yellow colored filter and a blue filter which alternate in sync with said display sequence of said compound color data components to block said inverse color components of said substantially featureless image from the view of the viewer.

44. The image altering apparatus of claim 33, wherein said plurality of compound color data components corresponding to each of said pixels have a cyclical display sequence determined in accordance with the following table:

| | |
|---|---|
| $R_I$ | $R_F$ |
| $G_F$ | $G_I$ |
| $B_F$ | $B_I$ | a. where $R_F$, $G_F$, and $B_F$ represent said fundamental color data components corresponding to the colors red, green and blue, respectively, of said fundamental color components of said fundamental image; and b. where $R_I$, $G_I$, and $B_I$ represent corresponding red, green and blue said inverse color data components of said fundamental color data components $R_F$, $G_F$, and $B_F$, respectively.

45. The image altering apparatus of claim 44, wherein said means for extracting said fundamental image from said substantially featureless image includes at least one color filter, time synchronized with said display sequence of said compound color data components to block said inverse color components of said substantially featureless image from the view of the viewer.

46. The image altering apparatus of claim 45, wherein said means for extracting said fundamental image includes a cyan colored filter and a red colored filter which alternate in sync with said display sequence of said compound color data components to block said inverse color components of said substantially featureless image from the view of the viewer.

47. The image altering apparatus of claim 33, including means for generating an overlay image signal to produce an image on said display which is visible to the naked eye, and which appears to be overlaid on said substantially featureless image, said overlay image signal having a corresponding overlay color data component time multiplexed with each of said compound color data components corresponding to each of said pixels, wherein said plurality of compound color data components and corresponding overlay color data components corresponding to each of said pixels have a cyclical display sequence determined in accordance with the following table:

| | | |
|---|---|---|
| $R_F$ | $R_I$ | $R_O$ |
| $G_O$ | $G_F$ | $G_I$ |
| $B_I$ | $B_O$ | $B_F$ | a. where $R_F$, $G_F$, and $B_F$ represent said fundamental color data components corresponding to the colors red, green and blue, respectively, of said fundamental color components of said fundamental image;

b. where $R_I$, $G_I$, and $B_I$ represent corresponding red, green and blue said inverse color data components of said fundamental color data components $R_F$, $G_F$, and $B_F$, respectively; and c. where $R_O$, $G_O$, and $B_O$ represent said overlay color data components corresponding to red, green, and blue overlay color components, respectively, of said overlay image.

48. A method for providing confidential viewing of a fundamental display image by a viewer, comprising the steps of:

a. providing a display comprised of a plurality of pixels and means for generating a fundamental image on said display, whereby said fundamental image has a plurality of fundamental color components of a predetermined intensity and wavelength corresponding to each of said pixels;

b. modifying said fundamental image by time multiplexing each of said fundamental color components at each of said pixels with at least one corresponding inverse color component of the same said wavelength, wherein at least one of said fundamental color components of said fundamental image is always displayed out of time-phase with the remainder of said fundamental color components, and each said inverse color component has an intensity which is determined as a function of the intensity of said corresponding fundamental color component, such that the composition of all fundamental color components and inverse color components forms a substantially featureless compound image; and c. extracting said fundamental image from said compound image for viewing only by the intended viewer through time-synchronized means of blocking said inverse color components of said compound image from the view of the viewer.

49. The method set forth in claim 48, wherein said step of modifying said fundamental image includes time multiplexing each of said fundamental color components at each said pixel with at least one corresponding inverse color component thereof, such that the time-weighted average of the intensity of each said fundamental color component and all said corresponding inverse color components thereof is substantially the same as for all other said fundamental color components and corresponding inverse color components corresponding to the same said pixel.

50. The method set forth in claim 48, wherein said step of extracting said fundamental image includes the use of at least one color filter, time synchronized to block said inverse color components of said compound image from the view of the viewer.

51. The method set forth in claim 48, including the step of providing means for generating an overlay image on said display which, to the naked eye, appears overlaid on said substantially featureless compound image, said overlay image being blocked from the view of the intended viewer through the use of said time-synchronized blocking means.

52. An image altering apparatus for providing confidential viewing of a fundamental display image by a viewer, comprising:

a. a display comprised of a plurality of pixels;

b. Beans for generating a fundamental image on said display, said fundamental image having a plurality of fundamental color components corresponding to each of said pixels;

c. means for modifying said fundamental image to generate a compound image on said display in which said fundamental image is masked, said compound image including a plurality of compound color components corresponding to each of said pixels;

d. each of said compound color components being comprised of at least one said fundamental color component of a predetermined wavelength time multiplexed with at least one corresponding masking color component of the same said wavelength;

e. said plurality of compound color components corresponding to each of said pixels having a display sequence characterized in that at least one of said fundamental color components is always displayed out of time-phase with the remainder of said fundamental color components corresponding to the same said pixel; and f. means for extracting said fundamental image from said compound image for viewing only by the viewer.

53. The image altering apparatus of claim 52, wherein each said masking color component constitutes an inverse color component of its corresponding said fundamental color component, thereby rendering said compound image substantially featureless.

54. The image altering apparatus of claim 53, wherein each said inverse color component has an intensity which is determined as a function of said corresponding fundamental color component, such that the time-weighted average of said intensities of all said fundamental color components and said corresponding inverse color components thereof is substantially the same for each of said compound color components of said compound image.

55. The image altering apparatus of claim 52, wherein each said compound color component is comprised of at least one said fundamental color component, time multiplexed alternately with at least one corresponding said masking color component thereof.

56. The image altering apparatus of claim 52, wherein each said compound color component is comprised of at least one said fundamental color component, time multiplexed randomly with at least one said corresponding masking color component thereof.

57. The image altering apparatus of claim 52, wherein each said compound color component is comprised of at least one said fundamental color component, time multiplexed sequentially with at least one said masking color component thereof.

58. The image altering apparatus of claim 52, wherein said plurality of compound color components at each of said pixels have a cyclical display sequence characterized in that at least one said masking color component of one of said compound color components is out of time-phase with said masking color components of other said compound color components corresponding to the same said pixel.

59. The image altering apparatus of claim 52, wherein said means for extracting said fundamental image includes at least one color filter, time-synchronized to block each said masking color component of said compound image from the view of the viewer.

60. The image altering apparatus of claim 2, wherein each said inverse color component has an intensity which is determined as a function of said corresponding fundamental color component, such that the time-weighted average of said intensities of all said fundamental color components and said corresponding inverse color components thereof is substantially the same for each of said compound color components of said compound image.

61. The image altering apparatus of claim 12, wherein said means for extracting said fundamental image includes at least one color filter, time-synchronized to block each said inverse color component and said overlay color component from the view of the viewer.

* * * * *

UNITED STATES PATENT AND TRADEMARK OFFICE
CERTIFICATE OF CORRECTION

PATENT NO. : 6,980,177 B2
APPLICATION NO. : 10/205864
DATED : December 27, 2005
INVENTOR(S) : David A. Struyk It is certified that error appears in the above-identified patent and that said Letters Patent is hereby corrected as shown below:

Column 8, Line 64, "VFR", should read --$V_{FR}$--

Column 12, line 55, "(ie., …)", should read --(i.e.,…)--.

Column 14, line 58, " 33% $gray$ : $Vinv = \left[ \dfrac{V_{max}^{\gamma}(V_{fund} + V_{off})^{\gamma}}{2} \right]^{\frac{1}{\gamma}}$."

should read -- 33% $gray$ : $Vinv = \left[ \dfrac{V_{max}^{\gamma} - (V_{fund} + V_{off})^{\gamma}}{2} \right]^{\frac{1}{\gamma}}$ --.

Column 14, line 60, " 50% $gray$ : $V_{inv} = \left[ \dfrac{1.5 V_{max}^{\gamma}(V_{fund} + V_{off})^{\gamma}}{2} \right]^{\frac{1}{\gamma}}$ "

should read -- 50% $gray$ : $V_{inv} = \left[ \dfrac{1.5 V_{max}^{\gamma} - (V_{fund} + V_{off})^{\gamma}}{2} \right]^{\frac{1}{\gamma}}$ --.

Column 14, line 63 " 66% $gray$ : $V_{inv} = \left[ \dfrac{2V_{max}^{\gamma}(V_{fund} + V_{off})^{\gamma}}{2} \right]^{\frac{1}{\gamma}}$ "

should read -- 66% $gray$ : $V_{inv} = \left[ \dfrac{2V_{max}^{\gamma} - (V_{fund} + V_{off})^{\gamma}}{2} \right]^{\frac{1}{\gamma}}$ --.

UNITED STATES PATENT AND TRADEMARK OFFICE
CERTIFICATE OF CORRECTION

PATENT NO.       : 6,980,177 B2
APPLICATION NO.  : 10/205864
DATED            : December 27, 2005
INVENTOR(S)      : David A. Struyk It is certified that error appears in the above-identified patent and that said Letters Patent is hereby corrected as shown below:

Col. 23, Claim 1, subparagraph (c), line 57, "Beans", should read --means--;

Col. 24, subparagraph (f), line 8, "Beans", should read --means--;

Col. 24, subparagraph (f), line 9, after "compound" insert --image--.

Col. 25, Claim 14, subparagraph (b), line 28, "Beans", should read --means--;

Col. 25, subparagraph (c), line 34, "Beans", should read --means--;

Col. 25, subparagraph (e), line 52, "Beans", should read --means--;

Col. 25, subparagraph (e), line 53, insert --,-- immediately after the word "pixels".

Col. 26, Claim 15, line 4, "intensity", should read --intensities--.

Col. 28, Claim 34, subparagraph (a), line 27, "were", should read --where--; subparagraph (b), line 31, "re" should read --red--.

Col. 31, Claim 52, subparagraph (b), line 50, "Beans", should read --means--.

Signed and Sealed this

Sixth Day of March, 2007

JON W. DUDAS
*Director of the United States Patent and Trademark Office*